US010215449B2

(12) United States Patent
Welles et al.

(10) Patent No.: US 10,215,449 B2
(45) Date of Patent: Feb. 26, 2019

(54) CATALYTIC HEATING SYSTEM AND METHOD FOR HEATING A BEVERAGE OR FOOD

(71) Applicants: Clifford G Welles, Pleasanton, CA (US); Noriko Welles, Pleasanton, CA (US)

(72) Inventors: Clifford G Welles, Pleasanton, CA (US); Noriko Welles, Pleasanton, CA (US)

(*) Notice: Subject to any disclaimer, the term of this patent is extended or adjusted under 35 U.S.C. 154(b) by 351 days.

(21) Appl. No.: 14/986,526

(22) Filed: Dec. 31, 2015

(65) Prior Publication Data

US 2016/0106260 A1 Apr. 21, 2016

Related U.S. Application Data

(63) Continuation of application No. PCT/US2015/038456, filed on Jun. 30, 2015.

(60) Provisional application No. 62/059,510, filed on Oct. 3, 2014.

(51) Int. Cl.
*A47J 36/28* (2006.01)
*F24V 30/00* (2018.01)
*A47J 36/26* (2006.01)
*A47J 36/30* (2006.01)

(52) U.S. Cl.
CPC .............. *F24V 30/00* (2018.05); *A47J 36/26* (2013.01); *A47J 36/30* (2013.01)

(58) Field of Classification Search
CPC ... A47J 36/26; A47J 36/28; A47J 36/30; F24J 1/00
See application file for complete search history.

(56) References Cited

U.S. PATENT DOCUMENTS

| | | | |
|---|---|---|---|
| 4,133,301 A | 1/1979 | Fujiwara et al. |
| 4,243,017 A | 1/1981 | Diederich |
| 4,510,907 A | 4/1985 | Atago et al. |
| 4,552,124 A | 11/1985 | Nakajima et al. |
| 4,631,024 A | 12/1986 | Shibata et al. |
| 4,911,143 A | 3/1990 | Pivot et al. |
| 5,799,648 A | 9/1998 | Oglesby et al. |
| 6,040,266 A | 3/2000 | Fay, III et al. |
| 6,244,853 B1 | 6/2001 | Oglesby et al. |
| 6,805,552 B2 | 10/2004 | Janouch et al. |
| 2004/0209206 A1 | 10/2004 | Hockaday et al. |
| 2008/0041859 A1 | 9/2008 | Teglbjarg |

*Primary Examiner* — Alfred Basichas
(74) *Attorney, Agent, or Firm* — Jay P. Hendrickson

(57) ABSTRACT

A catalytic heating system for heating a beverage or food that comprises: a container for containing the beverage or food and a catalytic combustion assembly for heating the container, with the catalytic combustion assembly comprising a fuel supply assembly having a fuel canister for supplying a fuel gas having a stoichiometric ratio of about 15 to an air mixing injector for injecting the fuel gas into an elongate sidewall enclosure having curved shape and defining an enclosed catalytic combustion chamber where a catalytic combustion process is generated, causing the complete combustion of all of the fuel gas and heating the container containing the beverage or food.

24 Claims, 19 Drawing Sheets

US 10,215,449 B2

CATALYTIC HEATING SYSTEM AND METHOD FOR HEATING A BEVERAGE OR FOOD

PRIORITY

This application is a continuation of International Application No. PCT/US2015/38456, filed on Jun. 30, 2015, which claims the benefit of U.S. Provisional Application No. 60/058,510, filed on Oct. 3, 2014.

TECHNICAL FIELD

This application relates to the use of systems and methods for the generation of heat for use in heating portable containers containing beverages or food, and more specifically to systems and methods for the generation of catalytically produced heat within an enclosed catalytic combustion chamber for heating a container containing a beverage or food.

BACKGROUND ART

Portable heating systems, such as camping stoves and lanterns, are well known in the art of designing and manufacturing such systems. Camping stoves generally utilize an open of partially open flame to heat the stove's contents, with an aerosol canister containing a pressured fuel, typically butane or propane or a combination of those fuels, to supply the fuel needed to maintain the flame. Lanterns, on the other hand, operate similarly to produce light. These devices have several well-known limitations, with the most obvious being the use of an open flame and the fire danger it possess. Other less obvious limitations are related to the chemical characteristics of butane and propane.

The working pressure available from fuel canisters containing butane (either iso-butane or n-butane) or propane or a mixture of such gases is effected by variations in temperature that create conditions that are not ideal for operating heating or lighting systems over a wide range of ambient temperatures and altitudes. Specifically, the useful working pressure for butane at lower ambient temperatures drops off significantly such that the proper operation of a heating or lighting device is impaired. Propane allows for operation at low ambient temperatures but requires a heavier and more expensive fuel canister to safely handle pressures that are normally encountered at higher ambient temperatures. Mixed fuel combinations of butane and propane have been developed to minimize the impact of pressure and temperature variation. But these combinations still suffer from a tendency of the more volatile components of the combined fuels, which have lower boiling points, to be used up sooner than the less volatile fuel components, resulting in unsatisfactory pressure remaining in the fuel canister as it is depleted, especially under cold conditions.

In addition to the limitations in using butane and propane to fuel an open flame device, butane and propane also have other significant limitations related to their potential use as a fuel source for a catalytic combustion process. An important characteristic for any fuel used in catalytic combustion is the light-off temperature, which is a rough indicator of the propensity for the fuel oxidation reaction to proceed. Light-off temperature is often defined as the temperature at which the conversion rate for the reactants reaches 50%, abbreviated as $T_{50}$. A low $T_{50}$ assists in the complete conversion of the fuel to heat without producing intermediate reaction products and pollutants, which may occur when trying to operate the catalytic combustion process at relatively low temperatures. A sufficiently low $T_{50}$ value will also allow for catalytic reactor designs that can use light weight metals such as aluminum without concern for exceeding material temperature limits or causing catalyst deterioration. The fuel gasses commonly, used such as butane and propane, all have relatively high $T_{50}$ values, limiting the possible material design choices and catalytic reactor operating parameters for the heating catalytic combustion chamber. The higher operating temperatures may also introduce unwanted design choices necessary to insure safe operating conditions for the user. Prior art is deficient in describing means for insuring fail-safe operation of catalytic heating in a wide variety of circumstances. Irrespective of fuel type, the prior art does not show how to adapt catalytic heating, to applications, such as, self-heated, temperature regulated portable beverage heating or cooking applications in a manner that assures a high degree of operational safety using techniques that are cost effective. Prior art also does not show how compressed gas fuel used in catalytic heat generation can be safely applied to an indoor application or while inside a transport vehicle, or any small enclosure such as a tent. All of these shortcomings, as well as, others associated with prior art catalytic heat generating devices, limit their applications or area of use.

In view of these and other problems in the prior art, it is a general object of the present invention to provide an improved apparatus and method utilizing a catalytic heat generating device that overcomes the drawbacks relating to the compromise designs of prior art devices as discussed above. Another object of the present invention is to provide a passive technique, which requires no externally provided power, for pre-mixing air and fuel which will provide air to fuel equivalence ratios of one or more when coupled to reactors that have relatively high back pressures.

SUMMARY DISCLOSURE OF THE INVENTION

A catalytic heating system for heating a beverage or food is presented that comprises: a container for containing the beverage or food; and a catalytic combustion assembly for heating the container that comprises: a chamber plate integral with the bottom of the container; an elongate sidewall enclosure integral with the chamber plate, with the elongate sidewall enclosure having a fuel gas inlet and an exhaust outlet within corresponding ends of the elongate sidewall enclosure, and with the elongate sidewall enclosure defining an enclosed catalytic combustion chamber; a catalytic reaction media disposed within the enclosed catalytic combustion chamber; a combustion starting element disposed within the enclosed catalytic combustion chamber; a fuel supply assembly mounted on a fuel supply platform, with the fuel supply assembly having a fuel and air mixing injector fluidly connected to the fuel gas inlet; a fuel canister sealably connected to the fuel supply platform and fluidly connected to the fuel supply assembly; and a fuel gas contained within the fuel canister. And, a shell containing the container and catalytic combustion assembly forms the catalytic heating system for heating the beverage or food. In operation the fuel and air mixing injector within the catalytic heating system can entrain the fuel gas with air and inject a fuel gas and entrained air mixture into the enclosed catalytic combustion chamber where the combustion starting element can ignite the fuel gas and entrained air mixture, and the catalytic reaction media can maintain a catalytic combustion process within the enclosed catalytic combustion chamber, and the catalytic combustion process can combust all of the fuel gas and heat the container containing the beverage or food.

A method of heating a container is also presented that comprises: providing for a flow of a fuel gas, with the fuel gas having a stoichiometric ratio of about 15; increasing the velocity of the flow of the fuel gas; entraining the flow of the fuel gas with air, thereby creating a flow of fuel gas and entrained air mixture; maintaining an entrainment ratio of about 15 or above for the flow of fuel gas and entrained air mixture; constraining the flow of fuel gas and entrained air mixture to an enclosed curved path; contacting the flow of fuel gas and entrained air mixture with a catalytic reaction media; igniting the flow of fuel gas and entrained air mixture, thereby generating the catalytic combustion process; combusting all of the fuel gas during the catalytic combustion process; and conducting heat from the catalytic combustion process to the container.

BEST MODE OF CARRYING OUT THE INVENTION

Figure 1A:
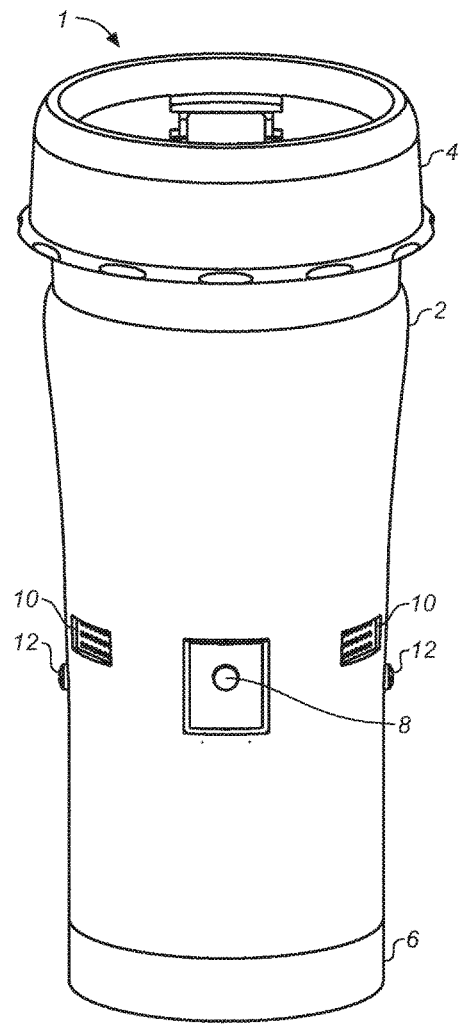
FIG. 1A is a top front perspective illustration of a catalytic heating system for heating a beverage or food.
Figure 1B:
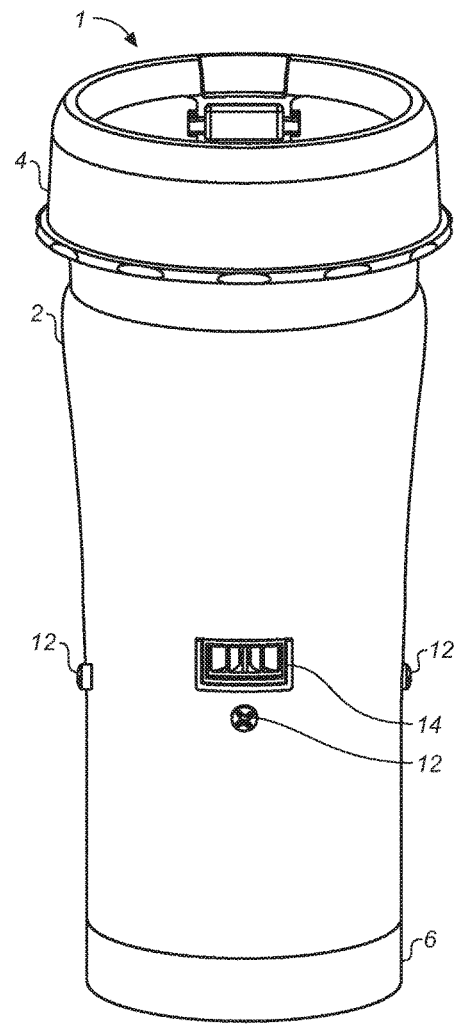
FIG. 1B is a top back perspective view of the catalytic heating system.

FIG. 1A and FIG. 1B illustrate a top front perspective view and a top back perspective view, respectively, of a catalytic heating system 1 for heating a beverage or food, with the catalytic heating system 1 preferably being portable. More specifically, FIG. 1A illustrates that the catalytic heating system 1 comprises an outer shell 2 having a cylindrical shape, a shell lid 4 removably attached to the outer shell 2, a canister base 6 adjacent to the outer shell 2, an on/off button 8 on an outside surface of the outer shell 2, a pair of air vents 10 for providing air passages into the inside of the outer shell 2, and a plurality of screws 12 for attaching the outer shell 2 to a catalytic combustion assembly 18 disposed within the outer shell 2. The catalytic combustion assembly is described in detail below. And, FIG. 1B shows that the outer shell 2 also contains an exhaust outlet duct 14 for providing an exhaust passage from the inside of the outer shelf 2 to atmosphere.

Figure 2:
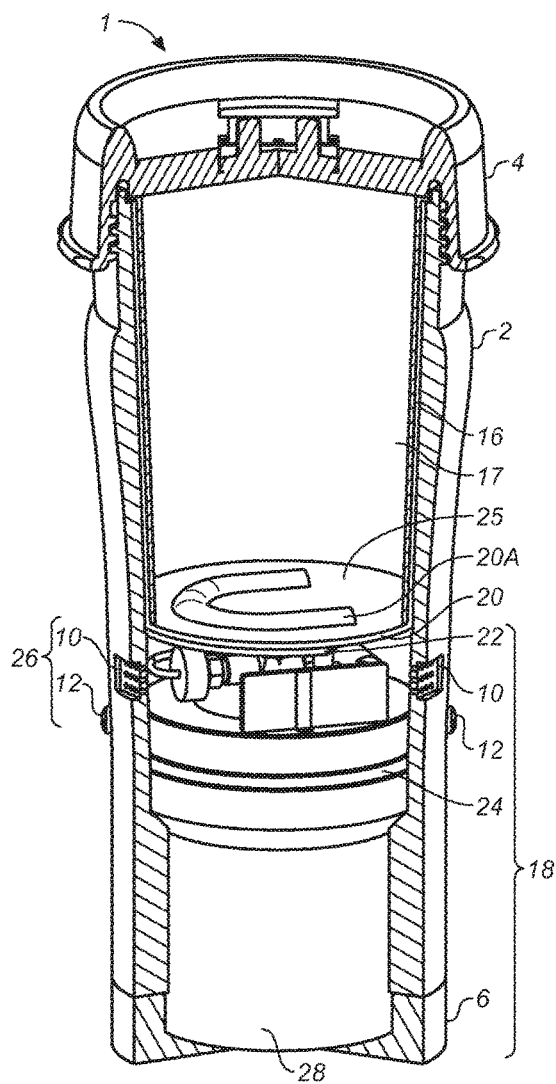
FIG. 2 is the same perspective illustration as in FIG. 1A, with portions of an outer shell and a container removed, showing the bottom of the container for containing a beverage or food and a catalytic combustion assembly.
Figure 3:
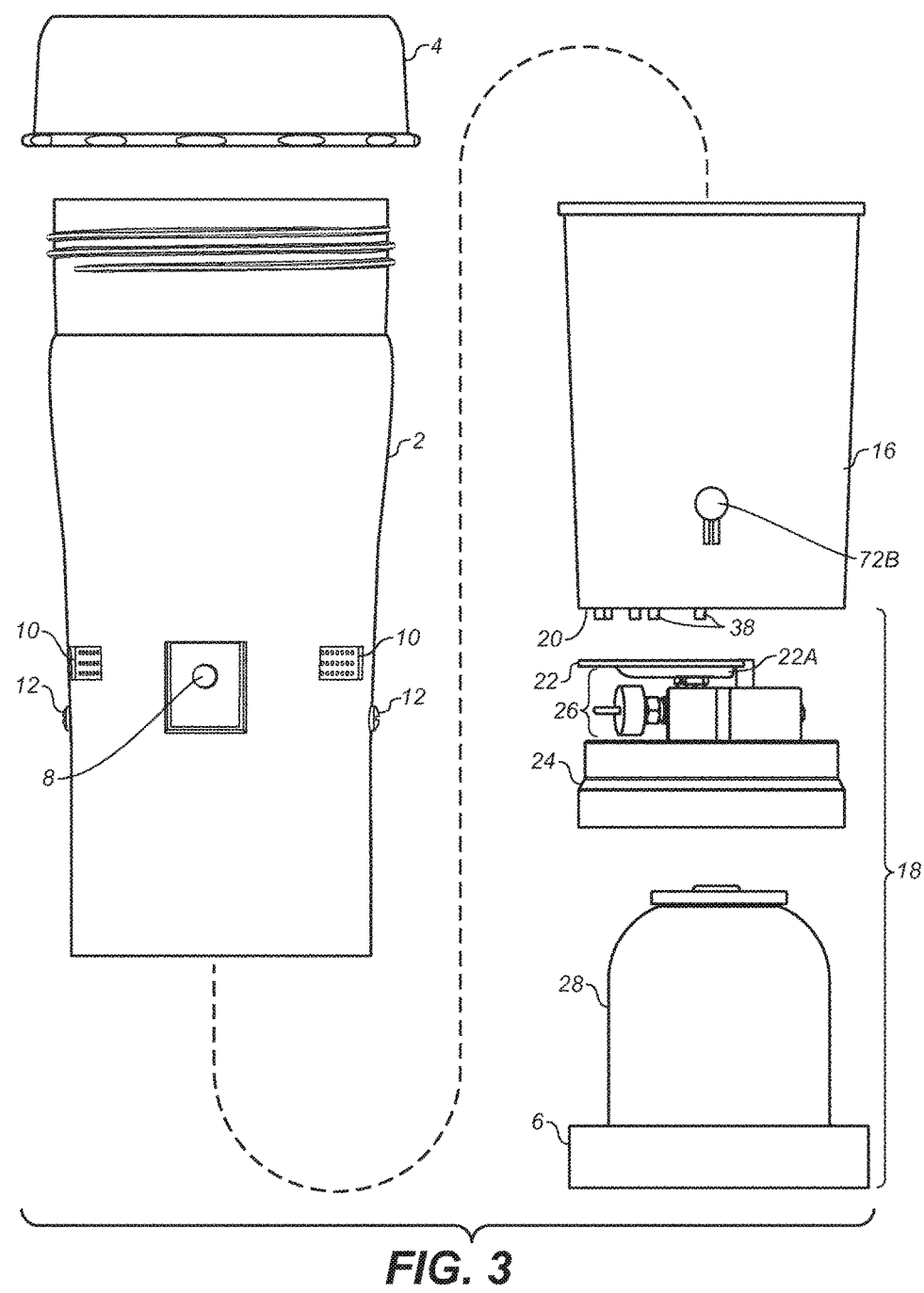
FIG. 3 is an exploded side view of the catalytic heating system, showing the outer shell, the container for containing the beverage or food, and the catalytic combustion assembly comprising a top chamber plate integral with the bottom of the container, a bottom chamber plate, a fuel supply assembly, a fuel supply platform and a fuel canister.

FIG. 2 and FIG. 3 illustrate that the outer shell 2 houses a container 16 for containing a beverage or food and the catalytic combustion assembly 18 for heating the container 16 and its contents. The figures also show that the catalytic combustion assembly 18 comprises: a top chamber plate 20 that can be integral with the bottom of the container 16; a bottom chamber plate 22 coupled to the top chamber plate 20, thereby forming an integrated chamber plate 25; a fuel supply platform 24; a fuel supply assembly 26 having tubular connections to the fuel supply platform 24 and to the bottom chamber plate 22; a fuel canister 28 having the canister base 6 attached to a bottom of the fuel canister 28, with the fuel canister 28 removably attached to the fuel supply platform 24; and dimethyl ether fuel gas 29 as the preferred fuel gas, contained in a state of compression within the fuel canister 28. For present purposes, a reference to a "fuel" or a "fuel gas" means fuel in a gaseous phase, unless indicated otherwise.

The container 16 and catalytic combustion assembly 18 can be secured to the outer shell 2 by bonding an outside top perimeter of the container 16 to an inside top perimeter of the outer shell 2. And, the fuel supply platform 24 can be secured to the outer shell 2 by using the plurality of screws 12 to attach an inside perimeter of the outer shell 2 to an outside perimeter of the fuel supply platform 24. The shell lid 4 can be removably attached to a top end of the outer shell 2 by screwing the shell lid 4, having female threads around its inside perimeter, to the outer shell 2, having male threads around its top outside perimeter. The container 16 can be any container that can conduct heat, such as a cup, mug or sauce pan; preferably the container will have a metallic composition. And, the outer shell 2 can be made of a thermally non-conductive material, preferably a polymeric material; alternatively, the container 16 can have a thermally insulating layer disposed between a sidewall 17 of the container 16 and the outer shell 2.

Figure 4:
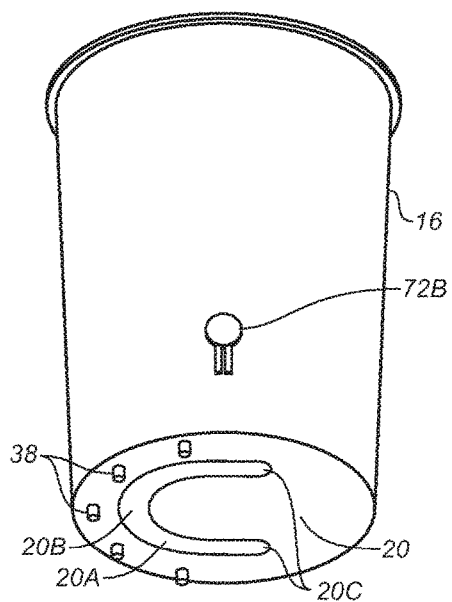
FIG. 4 is a bottom perspective view of the container for containing a beverage or food that more specifically illustrates the top chamber plate integral with the bottom of the container.

The components of the catalytic combustion assembly 18 are illustrated in more detail in FIG. 4 through FIG. 8. The container 16 can be sized such that the top chamber plate 20 can be attached to the bottom of the container 16, and in a preferred embodiment, as best shown in FIG. 4, the top chamber plate 20 is integral with the bottom perimeter of the container 16, thereby eliminating a seam that would be formed, if the top chamber plate 20 were not integral with the bottom of the container 16, but instead was attached in some manner to the bottom perimeter of the container 16. FIG. 4 and FIG. 5A through FIG. 5E further illustrate that a bottom surface of the top chamber plate 20 contains an top channel 20A, also shown in FIG. 2, that is integral with the top chamber plate 20 and preferably has a concave half-cylindrical shape that extends partially above the top surface of top chamber plate 20, with the top channel 20A also having a curved center section 20B and a pair of linear sections 20C integral with corresponding ends of the curved center section 20B. A top surface of the bottom chamber plate 22 similarly contains a bottom channel 22A that is integral with the bottom chamber plate 22 and preferably has a concave half-cylindrical shape that extends partially below the bottom surface of bottom chamber plate 22, with the bottom channel 22A having a curved center section 22B and a pair of linear sections 22C integral with corresponding ends of the curved center section 22B. When top and bottom chamber plates, 20 and 22, are aligned in a predetermined manner and coupled together to form the integrated chamber plate 25, top channel and bottom channel, 20A and 22A, form an elongate sidewall enclosure 32, having a preferred cylindrical shape, a curved sidewall center section 32A and a pair of linear sidewall end sections 32B integral with corresponding ends of the curved sidewall center section 32A. The elongate sidewall enclosure 32 encloses and defines an enclosed catalytic combustion chamber 30 that extends through the elongate sidewall enclosure 32, with the chamber 30 having the same curved and linear shape as the elongate sidewall enclosure 32. The elongate sidewall enclosure 32 and the enclosed catalytic combustion chamber 30 are best illustrated in FIG. 5C through FIG. 5E. The side view of FIG. 5C illustrates the top and bottom chamber plates, 20 and 22, after they have been coupled together forming the integrated chamber plate 25; the cross-sectional view of FIG. 5D shows the enclosed catalytic combustion chamber 30 enclosed within the elongate sidewall enclosure 32, with a catalytic reaction media 40 and a combustion starting element 50 (described below) removed, and the top plan view of FIG. 5E, with the top chamber plate 20 removed, further illustrates the enclosed catalytic combustion chamber 30, elongate sidewall enclosure 32 and the curved sidewall section 32A and pair of linear sidewall sections 32B, also with the catalytic reaction media 40 and combustion starting element 50 removed.

Figure 5A:
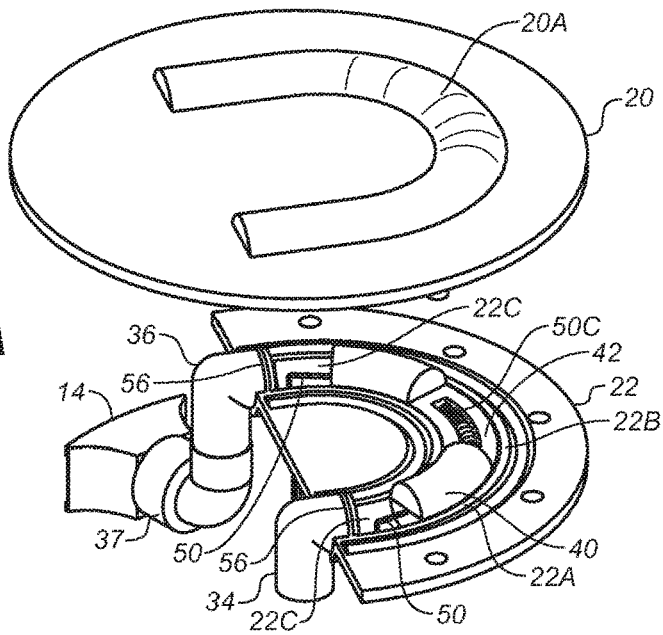
FIG. 5A is an exploded top perspective view of the top chamber plate and the bottom chamber plate, illustrating that a catalytic combustion chamber can be formed when the top and bottom chamber plates are coupled together.
Figure 5B:
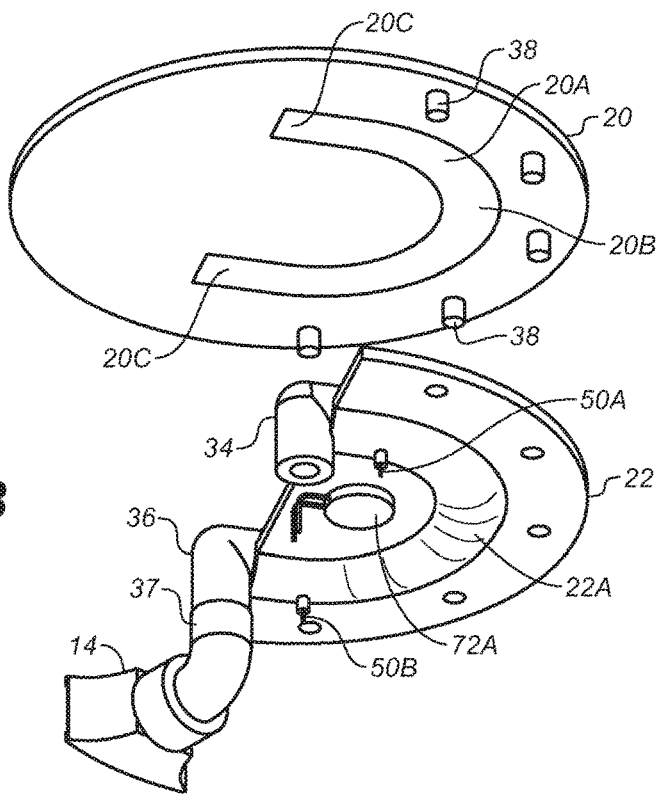
FIG. 5B is an exploded bottom perspective view of the top chamber plate and the bottom chamber plate, also illustrating that the catalytic combustion chamber can be formed when the top and bottom chamber plates are coupled together.
Figure 5C:
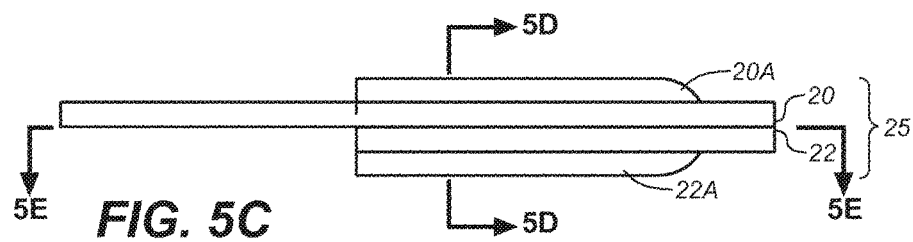
FIG. 5C is a partial side view of the top and bottom chamber plates that have been coupled together, forming the catalytic combustion chamber.
Figure 5D:
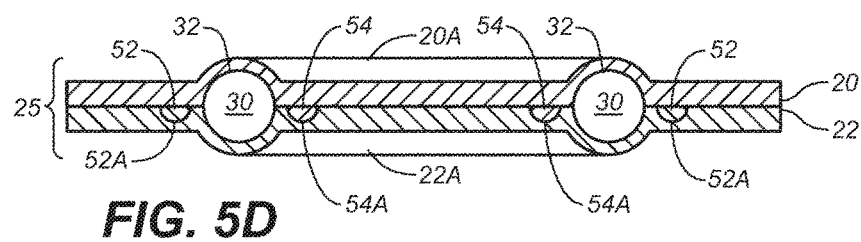
FIG. 5D is a cross-sectional view of FIG. 5C, providing a view in the direction indicated by the arrows 5D-5D in FIG. 5C.
Figure 5E:
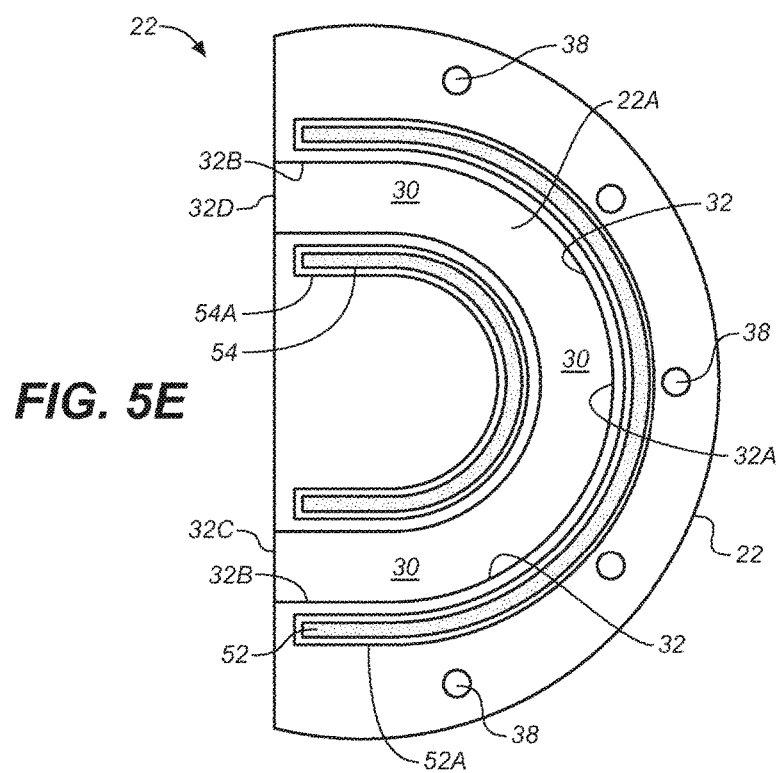
FIG. 5E is a top plan view of FIG. 5C with the top chamber plate removed, providing a view in the direction indicated by the arrows 5E-5E in FIG. 5C.

The elongate sidewall enclosure 32 preferably should have a diameter that is relatively small in order to ensure that the curved portion of the sidewall enclosure 32 can bend in a smooth and continuous fashion within the coupled chamber plates 20 and 22; and in order to more evenly distribute the heat generated from the enclosed catalytic combustion chamber 30 to the top chamber plate 20 that forms the bottom of the container 16 which, in turn, provides for a more even distribution of heat to the beverage or food. At the same time, however, the elongate sidewall enclosure 32 should have a diameter and total length that are large enough to contain a sufficient quantity of catalytic reaction media 40 over the length of the elongate sidewall enclosure 32 to produce a sufficient amount of heat to effectively heat the top chamber plate and the beverage or food within container 16. Given these considerations, the inventors have determined that the elongate sidewall enclosure 32 preferably should have a diameter of about 10 millimeters or less, and more preferably between about 5 and 10 millimeters. The elongate sidewall enclosure 32 also has a flow-through fuel gas inlet 32C within one end of the sidewall enclosure 32 and a flow-through exhaust outlet 32D within the other end of the sidewall enclosure 32, with the sidewall enclosure 32 having no other flow-through openings within the sidewall enclosure 32. And, as shown in FIG. 5A and FIG. 5B a flow-through fuel gas inlet elbow 34 and a flow-through exhaust outlet elbow 36 are sealably disposed within the flow-through fuel gas inlet 32C and the flow-through exhaust outlet 32D, respectively. The flow-through exhaust outlet elbow 36 also has a tubular connection 37 with the exhaust outlet duct 14 within the outer shell 2. The tubular connection 37 effectively extends the enclosed length of the elongate sidewall enclosure 32 from the flow-through exhaust outlet 32D of sidewall enclosure 32 to the exhaust outlet duct 14.

It is preferred that the top and bottom chamber plates, 20 and 22, can be coupled together by utilizing a plurality of binder posts 38, with top portions of the binder posts 38 disposed within corresponding openings the top chamber plate 20, with bottom portions of the binder posts 38 disposed within corresponding openings through the bottom chamber plate 22, and with bottom ends of the binder posts 38, which extend away from the bottom surface of the bottom chamber plate 22, used to couple the top chamber plate 20 to the bottom chamber plate 22 by flattening the ends of the binder posts 38 against the bottom surface of the chamber plate 22. Preferably, the top and bottom chamber plates, 20 and 22, have a metallic composition.

Before the enclosed catalytic combustion chamber 30 is formed by coupling the top and bottom chamber plates, 20 and 22, the catalytic reaction media 40 preferably can be positioned in a curved orientation, as shown in FIG. 5A, within the curved section 22B of bottom channel 22A. Alternatively, the catalytic reaction media 40 can be positioned in a curved and linear orientation within the curved section 22B of bottom channel 22A and within the pair of linear sections 22C of bottom channel 22A. Although the figure shows that a center top half of the catalytic reaction media 40 has been removed, this is only for the purpose of revealing a curved passage 42 that extends lengthwise through the interior of the catalytic reaction media 40. As also shown in FIG. 5A and FIG. 5B, a combustion starting element 50, preferably made from a narrow gage resistance wire alloy, such as Nichrome 60, Nichrome 80 or Kanthal, can be disposed lengthwise through a center portion of the catalytic reaction media 40, with one end 50A of the combustion starting element 50 disposed through an opening within the curved bottom channel 22A and another end 50B of the starting element 50 disposed through another opening through the curved bottom channel 22A, and with a center portion 50C of the combustion starting element 50 disposed through the curved passage 42 within the catalytic reaction media 40. Preferably, as illustrated in FIG. 5A, the center portion 500 of the combustion starting element 50 is coiled, which causes the combustion starting element 50 to attain a higher ignition temperature for a given amount of electrical power than would otherwise exist if the combustion starting element 50 were not coiled. The ends, 50A and 50B, of the combustion starting element 50 are in electronic connection with a programmed microprocessor 60 which, when activated, supplies electrical current from a battery 76, such as a lithium polymer type battery, to the combustion starting element 50. Alternatively, the combustion starting element 50 can be a spark ignition system comprising a pair of wires disposed within a lengthwise opening within the catalytic reaction media 40, with the pair of wires separated by a predetermined distance within the opening. A large transient electric voltage is formed between the wires using techniques well known to those skilled in the art, such as utilizing a piezoelectric crystal that can produce a substantial voltage when squeezed by mechanical means. The resulting large voltage causes the discharge of a spark between the pair of wires that ignites the catalytic reaction media 40. And, as shown in FIG. 5A through FIG. 5E, in order to ensure that the catalytic combustion process is confined to the enclosed catalytic combustion chamber 30, sealing members 52 and 54 can be disposed within corresponding sealing channels 52A and 54A within the top surface of the bottom chamber plate 22, with the sealing channel 52A concentrically positioned outside of bottom channel 22A and sealing channel 54A concentrically positioned inside of bottom channel 22A. In addition, a pair of O-rings 56 can be utilized to further ensure that the catalytic combustion process is confined to the enclosed catalytic combustion chamber 30, with one of the pair O-rings 56 disposed around a portion of flow-through fuel gas inlet elbow 34 and the other O-ring disposed around a portion of the flow-through exhaust outlet elbow 36.

Figure 6A:
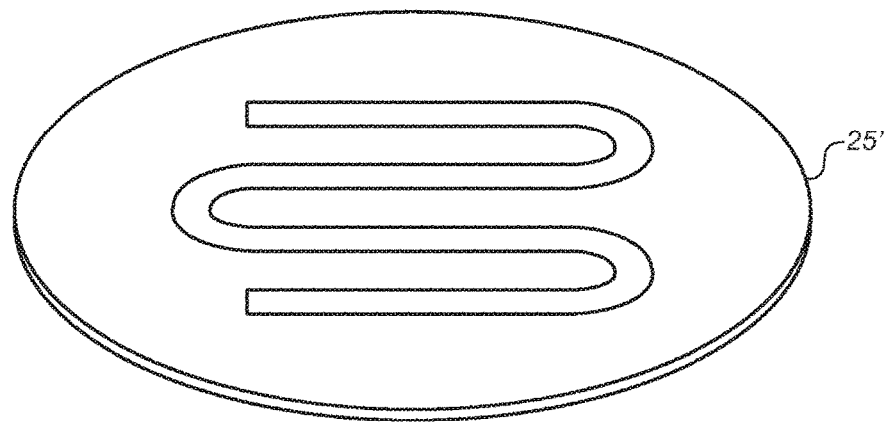
FIG. 6A and FIG. 6B illustrate a catalytic combustion chamber having a serpentine shape and having a coiled shape, respectively.
Figure 6B:
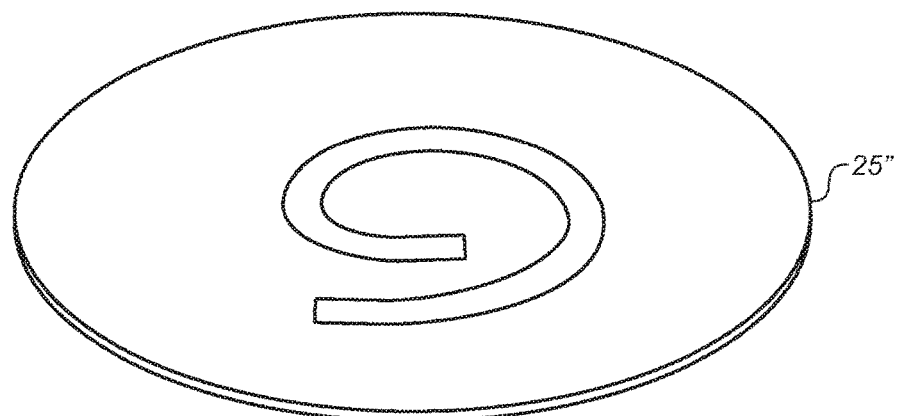

Once the catalytic reaction media 40 and combustion element 50 are positioned within the curved bottom channel 22A and the top chamber plate 20 is coupled to the bottom chamber plate 22, the catalytic reaction media 40 and the combustion element 50 are captured in a curved orientation within the curved sidewall section 32A of the elongate sidewall enclosure 32, thereby defining the enclosed catalytic combustion chamber 30 as having the same shape as the elongate sidewall enclosure 32. In this regard, a curved elongate shape for the enclosed catalytic combustion chamber 30 is preferred in order to more evenly distribute the heat from the combustion chamber 30 to the top chamber plate 20 and, thereby, provide for a more even distribution of heat to the beverage or food within container 16. And, the most preferred curved elongate shape for the enclosed catalytic combustion chamber 30 is a curvature having a constant radius of curvature (hereinafter referred to as a "circular curvature"), providing a smooth and continuous surface within the combustion chamber 30. Although the enclosed catalytic combustion chamber 30 having a circular curvature is preferred, other curved catalytic combustion chamber shapes could be utilized. For example, a serpentine shape within a chamber plate 25', as illustrated in FIG. 6A, or a coiled shape within a chamber plate 25", as shown in FIG. 6B, have shapes that are similarly smooth and continuous.

While there are several types of catalytic reaction media known in the art, the catalytic reaction media 40 preferably is an open cell metal foam substrate, combined with a wash coat and an active catalyst. It has been discovered that the use of an open cell metal foam substrate constructed from an iron, chromium, aluminum and yttrium alloy, under the trade name Fecralloy® or Kanthal® and manufactured by Porvair, Inc., provides an ideal substrate material for the catalytic reaction media 40. Metal foam substrates tend to have very high surface area to volume ratios and very high porosities. The first property is important to enhance the number of catalyst sites per unit volume, which affects the catalytic space velocity (i.e. quotient of the entering volumetric flow rate of the reactants divided by the reactor volume) in the enclosed catalytic combustion chamber 30 and the second property helps to minimize the pressure drop within the enclosed catalytic combustion chamber 30. The particular type of metal foam fabrication technique is important in determining the properties that make for an optimum catalyst media. Metal foams can be constructed by several techniques such as sintering or investment casting. The heat transport properties of metal foams made by sintering are very different than those made by investment casting and are far less costly. Sintered metal foams, such as the ones manufactured by Porvair Inc., have a unique micro-structure that resembles interconnected open cells in the shape of dodecahedrons. The cells are constructed of a series of interconnected metal struts. A cross-section of each strut would show it to be a hollow shell. The resulting light mass allows the material to reach high temperatures with very little energy input. This in turn helps to minimize the energy required by the starter filament to start the reaction. The metal substrate is traditionally given a wash-coat of some very high surface area material (e.g. gamma alumina) upon which a catalyst is deposited (e.g. Platinum). The Fecralloy® alloy contains aluminum, which under a suitable heat treatment will be driven to the surface where it is converted to alumina when exposed to a high temperature oxidizing atmosphere. The conversion to alumina provides a bonding interface if an alumina wash coat is utilized. However, it has been discovered that two additional properties exist that can be used advantageously when the Fecralloy® alloy is used as the catalytic reaction media 40. The first property is that the self-generating aluminum oxide film can act as its own wash coat, albeit of less surface area than a traditional gamma alumina wash coat. In some catalytic reactor designs this may provide an adequate catalyst site attachment points and consequently sufficient catalyst activity levels. By eliminating the traditional wash-coat step, costs are reduced. The second surprising additional property is that the Fecralloy material, after heat treating to induce a native film of aluminum oxide, appears to have a certain amount of inherent catalytic activity on its own, without adding additional catalysts. This further reduces costs by reducing the amount of additional catalyst required to attain a specific space velocity.

Figure 7A:
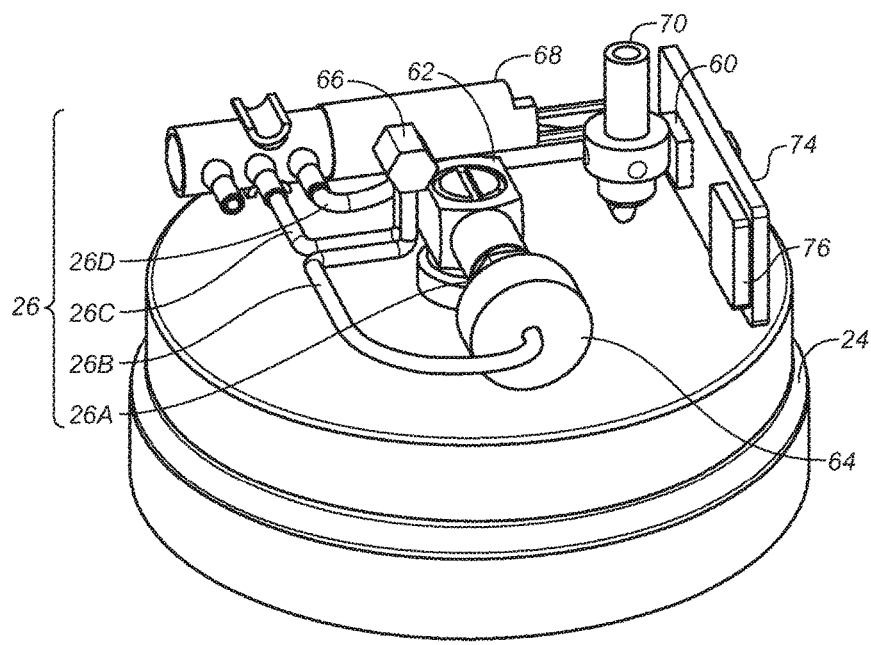
FIG. 7A and FIG. 7B are top perspective and top plan views, respectively, of the fuel supply assembly mounted on the fuel supply platform.
Figure 7B:
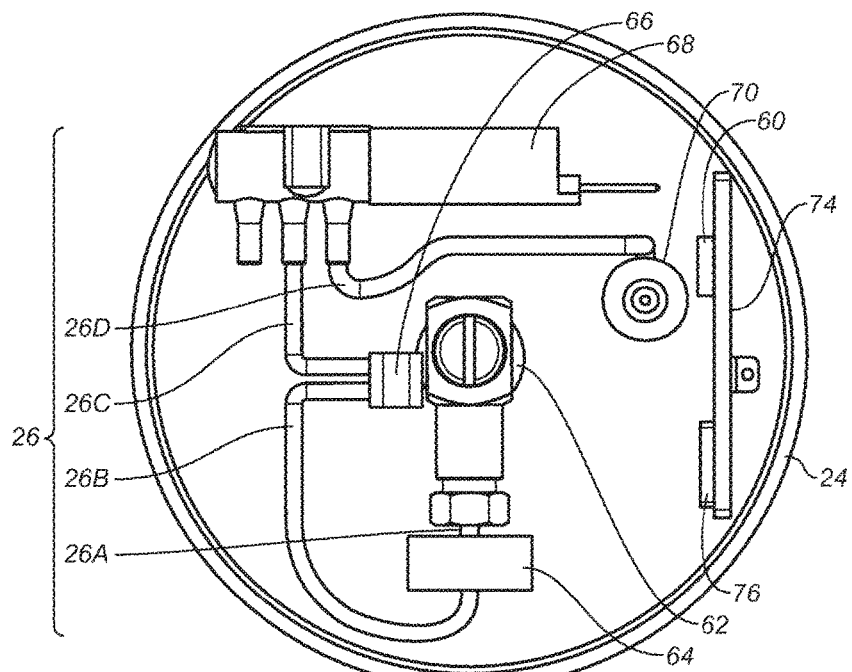

FIG. 7A and FIG. 7B more specifically illustrate the fuel supply assembly 26 that is mounted on a topside of the fuel supply platform 24. The fuel supply assembly 26 comprises the following fuel supply components: a fuel gas compression fitting 62 having a compression fitting and tap for use in fluidly connecting the fuel supply assembly 26 to the fuel canister 28, containing the dimethyl ether fuel gas 29; a liquid/gas separator 64, which could be, but not limited to, a porous oleophobic membrane such as "Supor R" made by Pall Corporation, having a tubular connection through tube 26A with the fuel gas compression fitting 62, with the liquid/gas separator 64 for removing any dimethyl ether fuel gas 29 that is in liquid form; a pressure regulator 66, such as an ultra-miniature regulator from the "PR-MLS" model series by Beswick Engineering, having a tubular connection through tube 26B with the liquid/gas separator 64, with the pressure regulator 66 for maintaining the pressure of the dimethyl ether fuel gas 29 at a predetermined level; a solenoid valve 68, such as the "LHL" series from the Lee Company, having a tubular connection through tube 26C with the pressure regulator 66, with the solenoid valve 68 for opening and closing the flow of dimethyl ether fuel gas 29 through the fuel supply assembly 26; a fuel and air mixing injector 70, such as a venturi injector, having a tubular connection through tube 26D with the solenoid valve 68, with the fuel and air injector 70 for injecting the dimethyl ether fuel gas 29 and entrained air mixture into the enclosed catalytic combustion chamber 30; a temperature sensor 72A attached to the bottom surface of the bottom chamber plate 22 for sensing the temperature within the enclosed catalytic combustion chamber 30; and a temperature sensor 72B attached to the outside surface of the sidewall 17 of container 16 for sensing the temperature of the container 16. And, the fuel supply assembly 26 is connected to the enclosed catalytic combustion chamber 30 by inserting a top end of the fuel and air mixing injector 70 into the flow-through fuel gas inlet elbow 34 in tubular connection with the enclosed catalytic combustion chamber 30.

The fuel supply assembly 26 further comprises the programmed microprocessor 60 that is attached to and in electrical connection to a circuit board 74 that is mounted on the top side of the fuel supply platform 24. A battery 76, such as a lithium polymer type GM502030 from PowerStream Technology, Inc., can also be attached to and in electrical connection to the circuit board 74; or the battery 76 can be attached to any other appropriate location within the catalytic combustion assembly 18 or within the outer shell 2 surrounding the catalytic combustion chamber 18. The battery 76 supplies electrical power to the programmed microprocessor 60 when the on/off button 8 is in the "on" position and disconnects electrical power when the on/off button 8 is in the off position. When activated, the programmed microprocessor 60, with inputs from the temperature sensors 72A and 72B, controls the functionality of the solenoid valve 68 in order to control the fuel gas flow rate and temperature within the enclosed catalytic combustion chamber 30. The activated programmed microprocessor 60 also supplies electrical power to the combustion starting element 50, which the microprocessor 60 coordinates with the supply of fuel gas to the enclosed catalytic combustion chamber 30 by opening and closing the solenoid valve 68.

Figure 8:
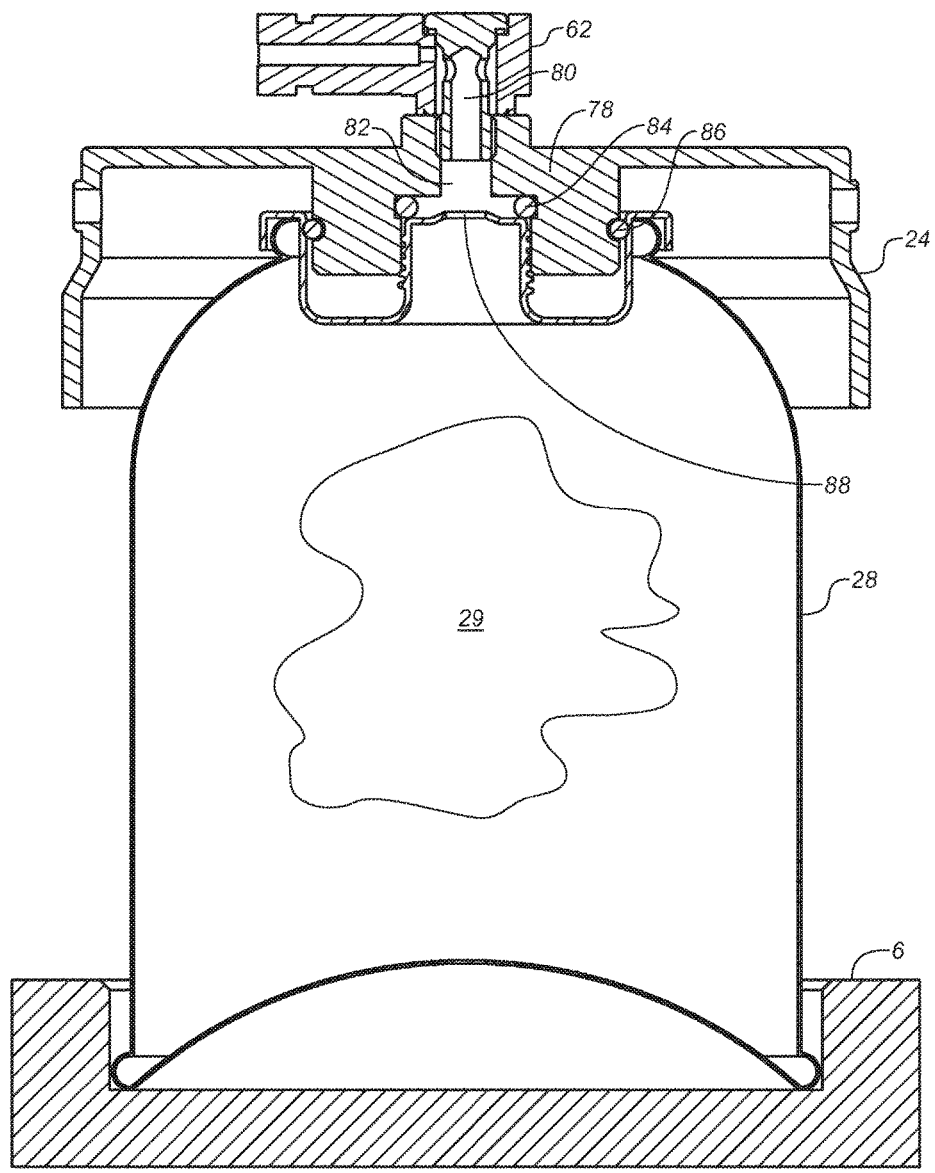
FIG. 8 is a cross-sectional side view of the fuel supply platform and the fuel canister releasably attached to the fuel supply platform.

The cross-sectional side view presented in FIG. 8 illustrates that fuel canister 28 can contain the dimethyl ether fuel gas 29 and that the fuel canister 28 can be releasably connected to the fuel supply platform 24. In order to facilitate the connection, the fuel supply platform 24 comprises a platform receptacle 78, integral with an underside of the fuel supply platform 24, that contains a platform receptacle opening 80 leading to a cylindrically shaped cavity 82, with the cavity 82 having: female threads extending distally from the opening 80; an inner O-ring 84 disposed within the cavity 82 and positioned distally from the female threads; and an outer O-ring 86 disposed around an outside surface of the platform receptacle 78. The fuel canister 28 contains a fuel flow valve 88, integral with the top of the fuel canister 28, and having male threads that can be used to connect the fuel canister 28 to the fuel supply platform 24 by screwing the fuel flow valve 88 into the platform receptacle 78. This action causes: 1) the tap within the fuel gas compression fitting 62 to open the fuel flow valve 88, thereby allowing the dimethyl ether fuel gas 29, which has been compressed within the fuel canister 28, to flow from the fuel canister 28 into the fuel supply assembly 26; and 2) an outside surface of the fuel canister 28 to engage the outer O-Ring 86 and the fuel flow valve 88 to engage the inner O-ring 84, thereby preventing dimethyl ether fuel gas 29 within the fuel canister 28 from escaping to atmosphere.

Figure 9A:
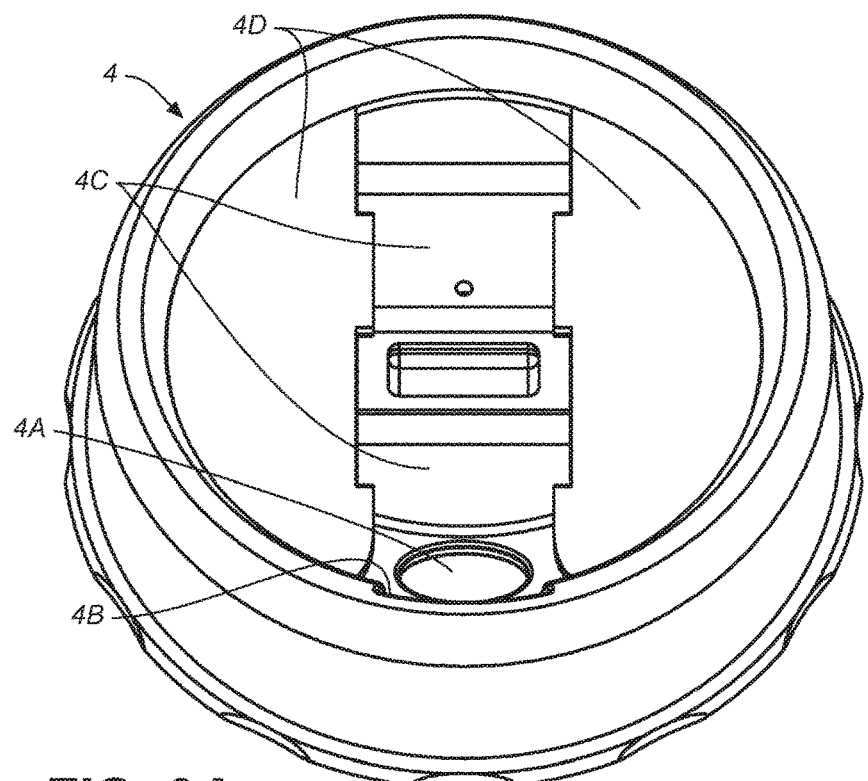
FIGS. 9A and 9B are top and bottom perspective views, respectively, of a shell lid.
Figure 9B:
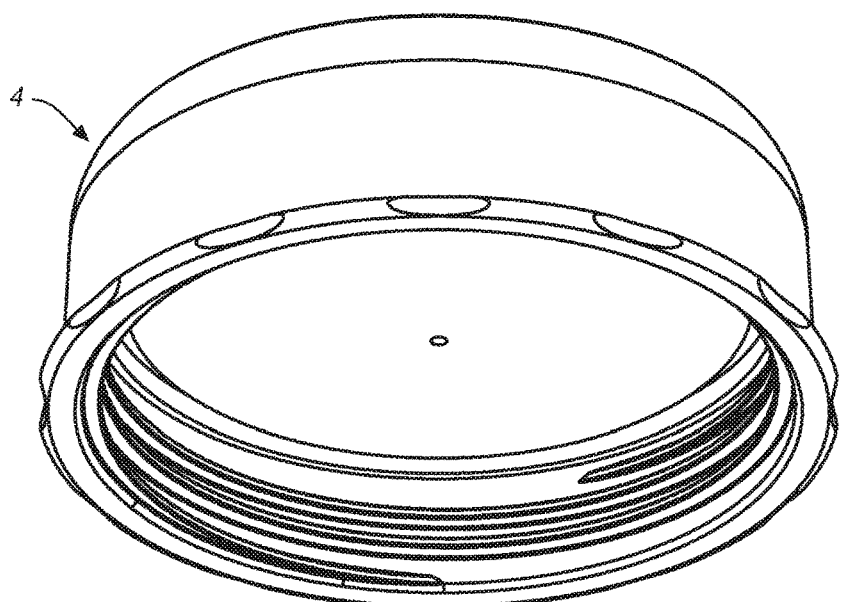

FIGS. 9A and 9B illustrate in more detail that the top of the shell lid 4 contains a flow opening 4A for allowing a beverage contained within the container 16 to flow out of the container 16 and into a flow guide 4B for channeling the flow of a beverage from the container 16. A shell slider valve 4C can be operated within a shell slider valve retainer 4D to open the shell slider valve 4C in order to allow the beverage to flow out of the container 16 or to close the shell slider valve 4C to prevent the beverage from flowing out of the container 16.

Specifically, operation of the catalytic heating system 1 can proceed by providing a flow of the dimethyl ether fuel gas 29 by attaching the fuel canister 28, containing the dimethyl ether fuel gas 29, to the fuel supply platform 24, by screwing the fuel flow valve 88 into the platform receptacle 78, which causes the tap within the fuel gas compression fitting 62 to open the fuel flow valve 88 and causes the dimethyl ether fuel gas 20 within the fuel canister 28 to flow through compression fitting 62 and into the fuel supply assembly 26. The dimethyl ether fuel gas 29 will initially flow through the liquid/gas separator 64, where any fuel gas in liquid form will be removed, and then flow through the pressure regulator 66 that will maintain the fuel gas below a predetermined pressure, and continue flowing until it reaches the solenoid valve 68. With the on/off button 8 in the "off" position, the solenoid valve 68 will be closed, which prevents the dimethyl ether fuel gas 29 from flowing into the fuel and air mixing injector 70. Next, the catalytic heating system 1 can be operated to heat a beverage or food by, if necessary, removing the shell lid 4 by unscrewing it from its engagement with the top of the outer shell 2. A beverage or food can then be placed into the container 16 and the shell lid 4 reattached to the outer shell 2. The catalytic combustion process that is utilized to heat the beverage or food is initiated by depressing the on/off button 8 to the "on" position, which activates the programmed microprocessor 60 by closing the circuit connection between the battery 76 and programmed microprocessor 60. At a predetermined time after activation, the programmed microprocessor 60 causes the solenoid valve 68 to open, causing the dimethyl ether fuel gas 29 to flow into the fuel and air mixing injector 70. As the dimethyl ether fuel gas 29 flows through the fuel and air mixing injector 70, the velocity of the fuel gas flow 29 will increase due to the distal narrowing of the injector 70. Increasing the velocity of the dimethyl ether fuel gas 29 causes the pressure in the fuel and air mixing injector 70 to decrease, thereby entraining the dimethyl ether fuel gas 29 with atmospheric air in order to produce a dimethyl ether fuel gas and entrained air mixture, while maintaining an entrapment ratio of about 15 or more parts air to about one part dimethyl ether fuel gas 29 for the mixture. The dimethyl ether fuel gas and the entrained air mixture is injected by the fuel and air mixing injector 70 into the flow-through fuel gas inlet elbow 34 and then into the elongate sidewall enclosure 32 defining the enclosed catalytic combustion chamber 30, thereby constraining the flow of the mixture though the enclosed catalytic combustion chamber 30 to the curved and linear path best illustrated in FIG. 5E. While the flow of the dimethyl ether fuel gas 29 and entrained air mixture is flowing through the enclosed catalytic combustion chamber 30, additional actions that contribute to the generation of the catalytic combustion process are: contacting the dimethyl ether fuel gas 29 and entrained air mixture with the catalytic reaction media 40 and the combustion starting element 50; activating the programmed microprocessor 60 to cause an electrical current to be supplied to the combustion starting element 50, which causes the combustion starting element 50 to heat up, thereby igniting the flow of dimethyl ether fuel and entrained air mixture and generating the catalytic combustion process within the catalytic reaction media 40 within enclosed catalytic combustion chamber 30. Importantly, this catalytic combustion process within the enclosed catalytic combustion chamber 30 can completely combust all of the dimethyl ether fuel gas 29. The heat generated by the catalytic combustion process causes the top channel 20A and top chamber plate 20 to heat up by conducting heat away from the catalytic combustion chamber, which in turn heats the container 16 and the beverage or food within the container 16. Exhaust generated from the catalytic combustion process passes through the flow-through exhaust outlet elbow 36, through the tubular connection 37 between the outlet elbow 36 and the exhaust outlet duct 14 within the outer shell 2, and out the exhaust outlet duct 14.

In addition to the advantages relating to the size and shape of the elongate sidewall enclosure 32 described above, the catalytic heating system 1 provides another beneficial feature related the combustion of the dimethyl ether fuel gas 29 and entrained air mixture within the enclosed catalytic combustion chamber 30. In particular, catalytic combustion process within the enclosed catalytic combustion chamber 30 is confined to the enclosed catalytic combustion chamber 30 defined by the elongate sidewall enclosure 32, with the only openings within the sidewall enclosure 32 being the flow-through fuel gas inlet 32C at one end of the sidewall enclosure 32 and the flow-through exhaust outlet 32D within the opposite end of the sidewall enclosure 32. This feature provides for a controllable and safe combustion process, including the feature of being able to safely transport all of the exhaust from the catalytic combustion through a single flow-through outlet to the environment outside of the catalytic heating system 1.

An inherent thermodynamically related limitation to the ability to achieve the complete combustion of all of the fuel gas in a catalytic combustion chamber is that the combustion process itself generates an amount of pressure in the chamber, generally referred to as "back pressure", that can prevent complete combustion of the fuel gas. Other factors that can also contribute to an increase in back pressure are related to fluid mechanical limitations involving the geometry of the combustion chamber. In this regard, it is to be reasonably expected that a catalytic combustion process within the enclosed catalytic combustion chamber 30 within catalytic heating system 1 would produce more back pressure than would be expected from the catalytic process itself. This expected increase in back pressure is due to the unique geometry of the enclosed catalytic combustion chamber 30, defined by the partially curved and cylindrical shaped elongate sidewall enclosure 32, and due to the fact that the sidewall enclosure 32 has a single flow-through fuel gas inlet 32C and single flow-through exhaust outlet 32D, with no other flow-through openings within the sidewall enclosure 32. And, in fact, as will be described in more detail below, during the development of the catalytic heating system 1, the inventors determined that neither butane nor propane could be used to overcome the back pressure generated in the enclosed catalytic combustion chamber 30 and achieve the complete combustion of the fuel gas. Achieving complete combustion of the fuel gas in the enclosed catalytic combustion chamber 30 is important because incomplete combustion results in the inefficient utilization of the fuel gas and due to the fact that incomplete combustion can also release toxic substances into the environment and potentially inhaled by a user of the catalytic heating system 1.

From a fluid mechanics standpoint, one way to overcome back pressure and obtain complete combustion of the fuel gas within the enclosed catalytic combustion chamber 30 within the catalytic heating system 1 is to reduce the total amount of work energy required to overcome both the back pressure and the energy needed to carry large quantities of entrained air through the combustion chamber 30 and out the exhaust. A fixed amount of kinetic and potential energy is imparted to the fuel gas stream as it first enters the fuel and air mixing injector 70. The amount of energy the fuel gas stream obtains as it enters mixing injector 70 is dependent upon the fuel gas pressure, the density of the fuel gas, and the geometry (i.e. size and shape) of the mixing injector 70 orifice. With these principals in mind, the inventors of the catalytic heating system 1 carried out experiments to determine if complete combustion in the enclosed catalytic combustion chamber 30 could be attained using either butane or propane, which are the fuel gases used in other portable heating devices for heating beverages or food. In order to achieve a complete combustion of the butane fuel gas, the stoichiometric ratio of butane, about 32 parts of air to one part of fuel, requires the fuel and air mixing injector 70 to produce a butane fuel gas and entrained air mixture having an entrapment ratio also of about 32 or more parts of air to one part of fuel. Similarly, in order to achieve a complete combustion of the propane fuel gas, the stoichiometric ratio of propane, about 25 parts air to one part fuel, dictates that the fuel and air mixing injector 70 produce a propane fuel gas and entrained air mixture having an entrapment ratio also of about 25 parts or more of air to one part of fuel. In their experiments, however, the inventors found that it was not possible to overcome back pressure and achieve complete combustion within the enclosed catalytic combustion chamber 30 using butane or propane as a fuel source. It was believed that this might have been due, at least in part, to the fact that attaining complete combustion using butane or propane as the fuel gas with the catalytic heating system 1 requires that air comprise a substantially greater percentage of the fuel gas and entrained air mixture due to the relatively high stoichiometric air to fuel ratios of these fuels. This in turn requires the fuel and air mixing injector 70 to provide relatively high entrapment ratios. The high entrainment ratios required by butane and propane contributes to a substantial increase in the work energy required to entrain air within the fuel and air mixing injector 70, leaving less energy available to perform the work necessary to flow the fuel and entrained air mixture through the enclosed catalytic combustion chamber 30. This explains, at least in part, the inability to overcome back pressures that can arise within the enclosed catalytic combustion chamber 30 when butane or propane is used as the fuel gas source.

A potential solution to this inability to overcome back pressure and achieve the complete combustion within the catalytic heating system 1 would be to use a different fuel having a lower stoichiometric ratio, allowing for a lower entrapment ratio required to achieve complete combustion in the enclosed catalytic combustion chamber 30. The ideal fuel gas would be one with a stoichiometric air to fuel ratio lower than the stoichiometric air to fuel ratios of butane or propane that would, therefore, give rise to less kinetic energy required to entrain air injected by the fuel and air mixing injector 70 into the enclosed catalytic combustion chamber 30, while still providing the same beneficial properties of butane and propane, such as being readily stored in a liquid state at pressures and temperatures compatible with portable consumer products. In fact, the inventors experimentally determined that dimethyl ether fuel gas 29 unexpectedly produces sufficient kinetic energy of the fuel gas to entrain an adequate amount of air as it exits the fuel and air mixing injector 70 and still have sufficient amount of kinetic energy remaining to overcome back pressure and achieve complete combustion within the enclosed catalytic combustion chamber 30.

In order to achieve a complete combustion of the dimethyl ether fuel gas 29 within the enclosed catalytic combustion chamber 30, the stoichiometric ratio of the dimethyl ether, about 15 parts of air to one part of fuel, requires the fuel and air mixing injector 70 to produce a dimethyl ether fuel gas 29 and entrained air mixture that has an entrapment ratio of about 15 or more parts of air to one part of fuel. In this regard, given identical flow through conditions within the fuel and air mixing injector 70 the inventors determined that, based upon fluid mechanical principles, the exit velocities from the mixing injector 70 for all three gasses should be within about 10% of each other. Thus, the kinetic energy available for driving the flow of fuel gas and entrained air mixture through the enclosed catalytic combustion chamber 30 should be roughly similar for each gas. As a result, the inventors hypothesized that dimethyl ether might have enough kinetic energy available to outperform butane and propane and possibly be able to overcome enough back pressure within enclosed catalytic combustion chamber 30 to achieve the complete combustion of the dimethyl ether. In fact, in experiments carried out by the inventors, they confirmed that their hypothesis was correct in that the experiments demonstrated not only was the utilization of dimethyl ether able to overcome more back pressure than butane and propane but that the complete combustion of the dimethyl ether was surprisingly achieved in the combustion chamber 30 within the catalytic heating system 1. The specific results of the inventors' experiments are summarized in the Table I below:

TABLE I

COMPARISON OF EXCESS AIR WITH FIXED VENTURI INJECTOR DESIGN UNDER IDENTICAL REACTION CHAMBER CONDITIONS

| FUEL GAS | STOICHIO-METRIC AIR-FUEL RATIO | FUEL GAS DENSITY (at STP) | EXCESS AIR |
|---|---|---|---|
| Dimethyl Ether | 15 to 1 | 2.055 [g/l] | Positive 10% |
| Butane | 32.5 to 1 | 2.593 [g/l] | Negative 30% |
| Propane | 25 to 1 | 1.967 [g/l] | Negative 15% |

As shown in the table, the inventors measured the quantity of air that was contained in the exhaust from using dimethyl ether, butane, and propane as the fuel gases that were combusted within in the catalytic combustion process within the catalytic heating system 1 as described above. In this regard, the specific dimensions for the cylindrically shaped elongate sidewall enclosure 32, enclosing and defining the enclosed catalytic combustion chamber 30, utilized in the experiments were the following: diameter=6.3 mm; radius of circular curvature=16.5 mm; length of circular curvature=50 mm; length of each linear section=4 mm; and overall length of the elongate enclosure from the fuel gas inlet to the exhaust outlet duct=85 mm. The catalytic combustion process utilizing dimethyl ether generated an exhaust containing about 10% more air than required to maintain a complete combustion of the dimethyl ether in the enclosed catalytic combustion chamber 30, establishing that all of the dimethyl ether was combusted. The results for butane and propane, however, demonstrate that butane and propane generated 30% and 15% less air, respectively, than would have been required to completely combust those fuel gasses, meaning that not all of the butane or propane was completely combusted.

Another unexpected result of using dimethyl ether fuel gas 29 as the fuel source for the catalytic heating system 1 arises from thermodynamic considerations that pertain to light-off temperature, which is often defined as the temperature, often abbreviated as $T_{50}$, at which 50% of the fuel gas has been combusted within the combustion chamber. Since the light-off temperature of dimethyl ether is significantly lower than the light-off temperature of butane and propane, complete combustion of dimethyl ether in a catalytic combustion process occurs at a significantly lower temperature than either butane or propane, which also indicates that the complete combustion of dimethyl ether generates less back pressure that butane or propane. As a result the combination of a low entrapment ratio and a low light-off temperature can be expected to work together to reduce back pressure within the enclosed catalytic combustion chamber 30.

In addition, the ability to achieve complete combustion of the dimethyl ether fuel gas 29 in the enclosed catalytic combustion chamber 30 gives rise to another unexpected result related to potential flame propagation within the combustion chamber 30. In any catalytic reaction process within a combustion chamber it is important to limit or prevent flame generation inside or outside of the chamber.

For example, if a combustible mixture of fuel gas and air were to accumulate in a region outside of the reaction chamber it would be desirable to insure that no flame could be generated as a result of the catalytic reaction occurring within the reaction chamber. Similarly, if the temperature within the reaction chamber were to reach levels at or above the lowest temperature at which the fuel gas will spontaneously ignite without an external source for ignition, generally referred to as the "auto-ignition temperature", flame propagation events could become more likely and should be prevented. In this regard, it has been reported that in order to achieve this result, the chamber geometry should have certain dimensional relationships. In particular, reaction chambers, like the enclosed catalytic combustion chamber 30 that are elongated and cylindrically shaped, surprisingly provide the foundation for limiting or preventing flame propagation events. In this regard, an important parameter related to the shape of the reaction chamber is the critical flame quenching diameter. Cylindrical chambers with diameters below this critical value will not allow flames to propagate, and it is generally known that quenching diameters for most hydrocarbon fuels, including dimethyl ether, are in the range of about 10 millimeters or less for mixtures that have an air to fuel equivalence ration of between about 0.6 and 1.0 (e.g., *Proceedings of the International Conference on Heat Transfer and Fluid Flow, Prague, Czech Republic*, Aug. 11-12, 2014, Paper No. 36: "Quenching Distance and Quenching Diameter Ratio for Flame Propagating in Propane/Air mixtures", by Arthur N. Gutkowski and Teresa Parra-Santos). This critical flame quenching diameter unexpectedly overlaps the preferred diameter of the elongate enclosure 32 enclosing the combustion chamber 30 of between 5 and 10 millimeters. More specifically, by simply specifying that the elongate enclosure 32 preferably has a diameter of about between 5 and 10 millimeters, the catalytic heating system 1 is able to surprisingly achieve the unrelated favorable effects of: 1) an evenly distributed heating pattern for heating the beverage or food and simultaneously fill the enclosed catalytic combustion chamber 30 with a sufficient amount of catalytic reaction media 40 to achieve an adequate heating power to heat the beverage or food; and 2) preventing or limiting flame propagation within the enclosed catalytic combustion chamber 30.

Although dimethyl ether is known to be useful as a fuel source in some contexts, the fuel is not disclosed as a fuel source in a catalytic combustion application as disclosed by the catalytic heating system and 1. And, there are reasons why persons skilled in the art of open flame devices have utilized fuels like butane and propane; rather than dimethyl ether as a potential fuel gas source. One such reason is that dimethyl ether has an energy density of about 68,930 BTU/cubic foot, which is notably less than the energy densities of butane and propane, with butane having an energy density of about 94,000 BTU/cubic fool and propane having an energy density of about 84,250 BTU/cubic foot. Since devices for heating beverages and food have limited amounts of stored fuel gas, it is desirable to use fuel gases like butane and propane with high energy densities so that sufficient heating can be produced with a minimum amount of fuel. Dimethyl ether, with its lower energy density, would most likely not be considered as a suitable alternative. The inventors have surprisingly discovered, however, that due to the combination of dimethyl ether's relatively low light-off temperature, low stoichiometric air to fuel ratio, and a more ideal vapor pressure characteristic, these advantages outweigh the potential disadvantage of the lower energy density of dimethyl ether as a fuel gas utilized in the catalytic heating system and 1.

Another reason that dimethyl ether might not be considered as an acceptable fuel source is that ether compounds are generally known to have the characteristic of forming dangerous peroxide compounds when exposed to air. However, the inventors of the catalytic heating system 1 have determined that dimethyl ether does not exhibit that characteristic.

In addition to having a relatively low entrapment ratio and light-off temperature that combine to achieve complete combustion within the catalytic heating system 1, the utilization of dimethyl ether fuel gas 29 as the fuel source for the catalytic heating system 1 has other unexpected advantages over other fuel gases like butane and propane. One such advantage is that the use of the dimethyl ether fuel gas 29, allows the catalytic heating system 1 to be operated at altitudes above sea level, while still achieving complete combustion. This advantage can be implemented by setting the fuel and air mixing injector 70 to inject less fuel gas into the enclosed catalytic combustion chamber 30, causing the chamber 30 to receive a fuel gas and entrained air mixture having an entrapment ratio somewhat higher than the ratio needed for achieving complete combustion in the chamber 30 at sea level. Although the "lean" fuel gas condition would prevent the consumption of all of the air injected into the chamber 30, complete combustion of the fuel gas would still be achieved. Then, as the catalytic heating system 1 is operated at increasingly higher altitudes above sea level, the fuel and air mixing injector 70 will increasingly deliver a richer mixture of air and fuel gas, until reaching an altitude where the mixture will produce a stoichiometric condition, where all of the air and fuel gas are being utilized in a complete combustion process within the enclosed catalytic combustion chamber 30. Fuel gases, such as butane and propane, that require a higher entrapment ratio at sea level than dimethyl ether will not be able to achieve a stoichiometric condition at an altitude as high as that achievable by dimethyl ether. Thus, the catalytic heating system 1 that utilizes the dimethyl ether fuel gas 29 as its fuel source is surprisingly more useful over a greater range of altitudes above sea level than other fuels having higher entrapment ratios.

The catalytic heating system 1 has still other surprising advantages over other devices that use butane or propane to heat beverages or food. Dimethyl ether has a useful working pressure at lower ambient temperatures than butane, thus, enhancing the usefulness of dimethyl ether in outdoor applications. And, although propane can be used at lower temperatures, it cannot be used in lighter weight and less expensive canisters that comply with Department of Transportation regulation DOT 2Q but must be used in much heavier and more costly canisters. Dimethyl ether, on the other hand, can be used in canisters that comply with the regulation and at a lower cost.

Figure 18:
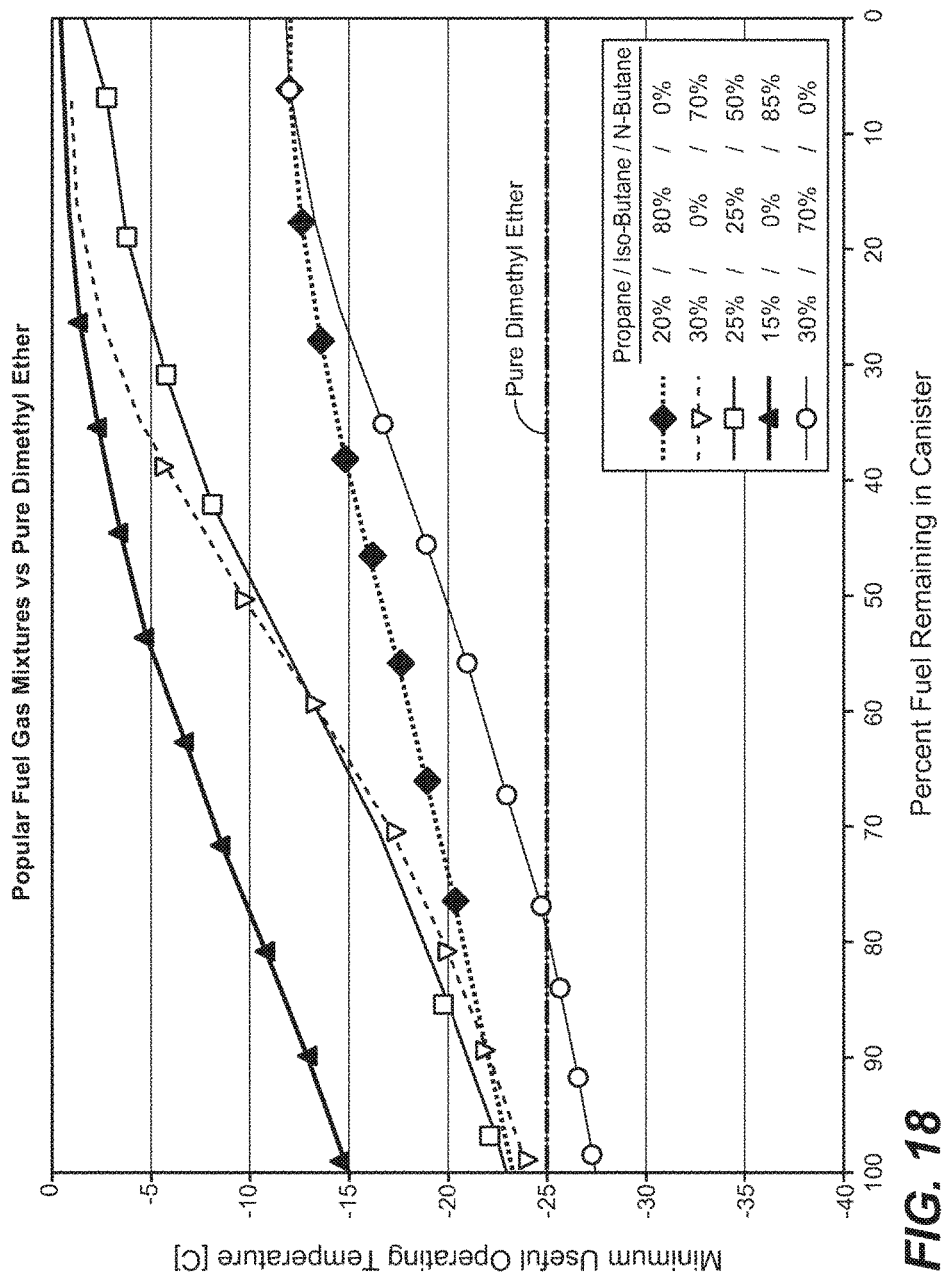
FIG. 18 is a graphical representation of minimum useful ambient operating temperature as a function of percentage of fuel remaining in a fuel canister at sea level.

In this regard, a common approach to improve the useful working pressure at lower ambient temperatures is to combine a mix of high and low boiling point liquefied gases. The graph depicted in FIG. 18 plots minimum useful ambient temperature as a function of percentage of fuel remaining in the canister at sea level, with "minimum useful temperature" being defined as the temperature below which the canister pressure is no longer sufficient to deliver the fuel gas at a suitable rate to the reaction chamber to obtain a targeted amount of heat power. Specifically, the graph illustrates that although mixed fuel gas formulations will provide good low temperature performance when the canister is full, the higher boiling point gas (i.e. propane) will leave the canister at a faster rate, eventually leaving behind mostly low boiling point gases (i.e. butane). Using pure propane or other similar high boiling point liquefied fuel gas would require much heavier and more expensive canisters. Canisters currently used by the aerosol industry would not provide an acceptable solution because propane's equilibrium vapor pressure exceeds both DOT and European safety specifications. The graph also shows, however, that dimethyl ether not only meets these specifications but provides both good low temperature performance and a steady performance as the canisters fuel is depleted.

The catalytic heating system 1 for heating a beverage or food is also substantially safer than flame based systems used for the same purposes. Flame based systems obviously present a potential that the open flame could ignite flammable objects in the environment. For example, if a flame based device tips over inside a camping tent, it will almost certainly start a fire inside the tent if the flame contacts a sleeping bag or clothing. Since the catalytic combustion process that takes place in the catalytic heating system 1 does not generate a flame and burns a much lower temperature than a flame based system, it is much less likely to start a fire under the same conditions.

Another surprising advantage of the catalytic heating system 1 is that the fuel supply assembly 26 and electronic components, comprising the programmed microprocessor 60 and battery 76, are all mounted on the fuel supply platform 24. The advantage of this feature is that when the fuel canister 23 releases the dimethyl ether fuel gas 29 into fuel supply assembly 26, the Joule-Thompson effect, which occurs during expansion of most gases, including dimethyl ether, cools the fuel supply assembly 26 and fuel supply platform 24, which, in turn, cool down the circuit board 74 containing the microprocessor 60 and battery 76. Consequentially, the distance between the fuel supply platform 24 and the bottom chamber plate 22 only needs to be sufficient to make room for the fuel supply assembly 26, without concern that the convective and radiant heat from the bottom chamber plate 22 will cause an overheating of the circuit board 74 and its electronic components. This cooling effect unexpectedly allows for a more compact design for the catalytic heating system 1.

In an another embodiment, a catalytic heating system 100 for heating a beverage or food is described is described in FIG. 10A through FIG. 17B. The primary difference between the catalytic heating system 100 and the catalytic heating system 1 is that in the catalytic heating system 1 the container 16 for containing a beverage or food is integral with the top chamber plate 20 within the catalytic combustion assembly 18, and the container is not intended to be used separately from the catalytic combustion assembly 18. However, in the catalytic heating system 100, a container 120 for containing a beverage or food is not integral with a catalytic combustion assembly 122 and is intended, if desired, to be used separately from the catalytic combustion assembly 122. With respect to the similarities between the figures illustrating catalytic combustion assemblies, 18 and 122, the only difference between the component parts illustrated in FIG. 5A through FIG. 5E and those illustrated in FIG. 14A through FIG. 14E is that the top channel 124A disclosed in FIG. 14A through FIG. 14E does not extend above the top surface of top chamber plate 124, which as a result is slightly thicker than top chamber plate 20A disclosed in FIG. 5A through 5E. With respect to the component parts of FIG. 15A through FIG. 17B, they are identical to FIG. 7A through 9B. And, although the component identification numbers for the corresponding sets of figures are not the same, corresponding components are identical. For example, a fuel supply assembly 130 illustrated in FIG. 15A and FIG. 15B pertaining to the catalytic heating system 100 is identical to fuel supply assembly 130 illustrated in FIG. 7A and FIG. 7B pertaining to catalytic heating system 1.

Figures 10A, 10B:
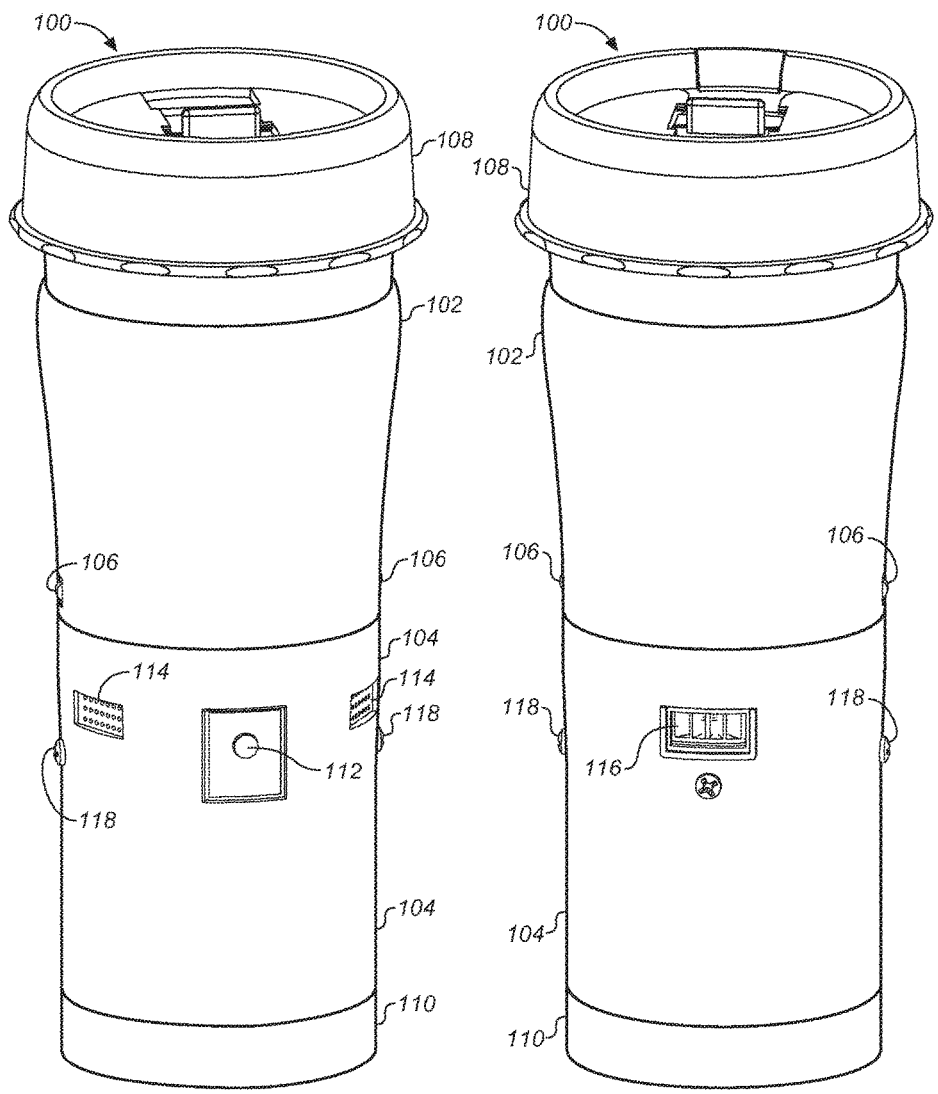
FIG. 10A is a top front perspective illustration of another embodiment of the catalytic heating system for heating a beverage or food.
FIG. 10B is a top back perspective view of the other embodiment of the catalytic heating system.
Figure 10C:
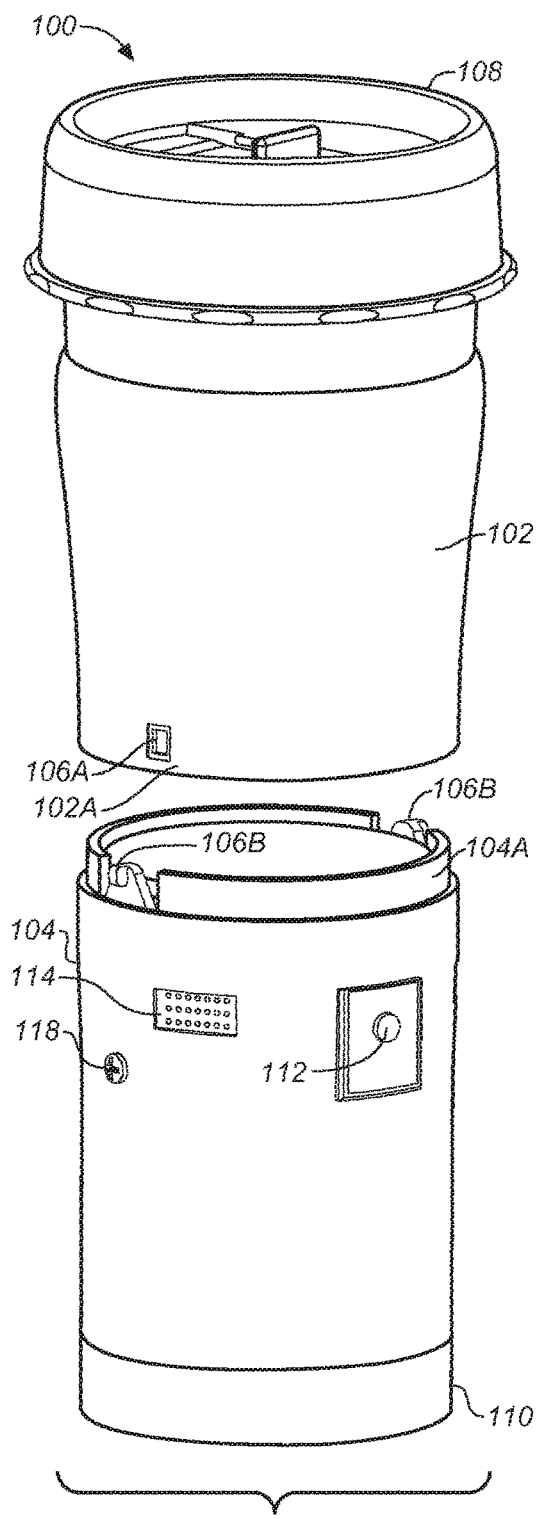
FIG. 10C is a top front perspective view of the other embodiment of the catalytic heating system, illustrating that the system can be separated into an upper shell module and a bottom shell module.

FIGS. 10A and 10B illustrate a top front perspective view and a top back perspective view, respectively, of a catalytic heating system 100 for heating a beverage or food, with the catalytic heating system 100 preferably being portable. More specifically, FIG. 10A illustrates that the catalytic heating system 100 comprises an upper shell module 102 having cylindrical shape and a lower shell module 104 also having a cylindrical shape. The catalytic heating system 100 further comprises a shell lid 108 removably attached to the upper shell module 102, a canister base 110 adjacent to the lower shell module 104, an on/off button 112 on an outside surface of the lower shell module 104, a pair of air vents 114 providing air passages into the inside of the lower shell module 104, a plurality of screws 118 for attaching the lower shell module 104 to the catalytic combustion assembly 122 disposed within the lower shell module 104 as described below, and a snap-fit system 106 for releasably attaching the upper shell module 102 to the lower shell module 104. FIG. 10B illustrates that the lower shell module 104 contains an exhaust outlet duct 116 for providing an exhaust passage from inside of the lower shell module 104 to atmosphere. And, FIG. 10C shows more specifically that the snap-fit system 106 can be utilized to separate upper shell module 102 from the lower shell module 104. Snap-fit system 106 comprises a female portion 106A that is integral with a circumferential bottom portion 102A of the upper shell module 102 and a male portion 106B that is integral with a circumferential band 104A integral with a top end of lower shell module 104. The snap-fit system 106 can be operated to detach the upper shell module 102 from the lower shell module 104 by depressing the male portion 106B, thereby releasing its engagement with the corresponding female portion 106A, and allowing the upper and lower shell modules, 102 and 104, to be separated. Then the separated modules can be reconnected by simply inserting circumferential band 104 of the lower shell module 104 into the circumferential bottom portion 102A of the upper shell module 102 until the female and male portions, 106A and 106B, reengage.

Figures 11, 13:
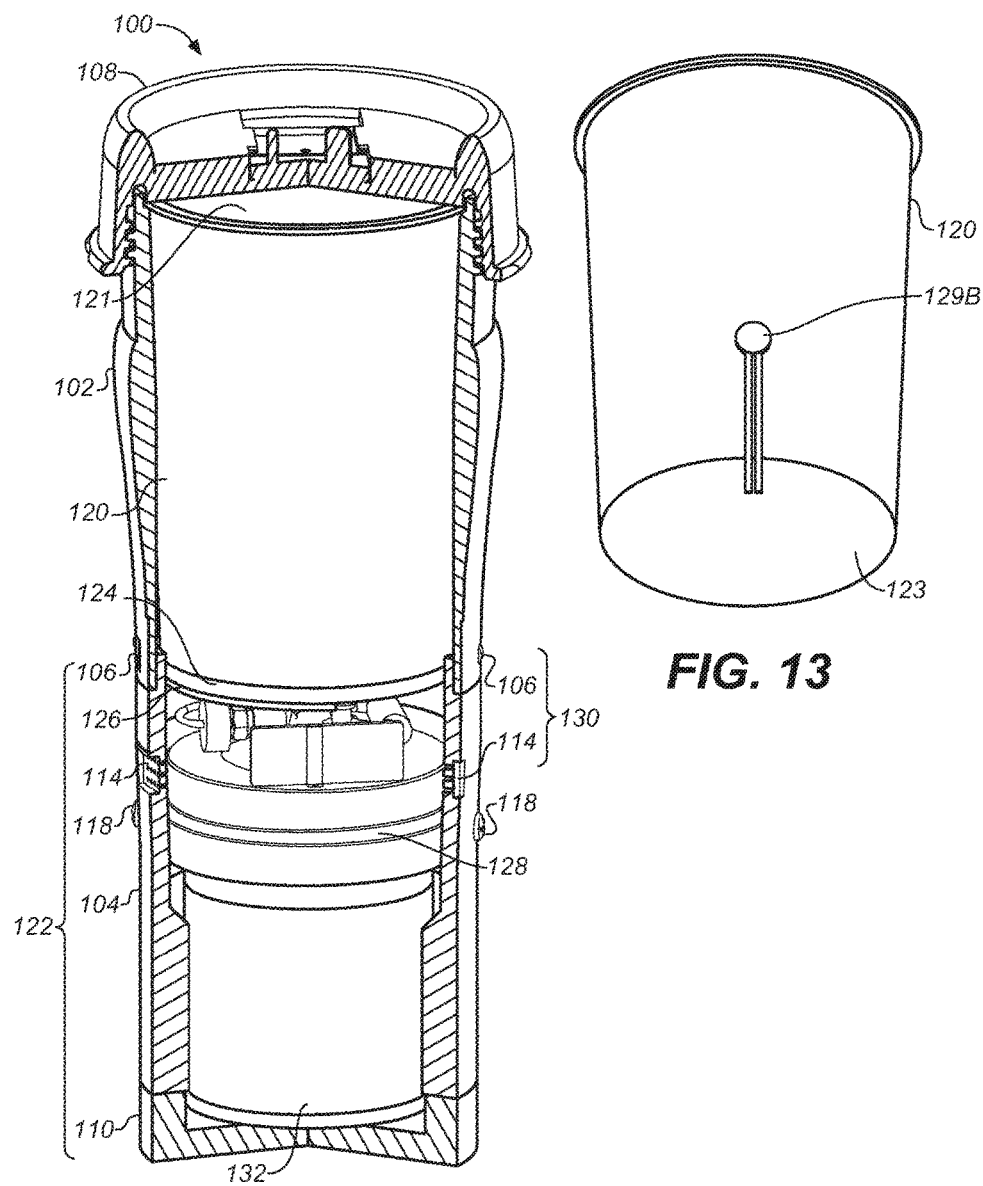
FIG. 11 is the same perspective illustration as in FIG. 10A, with portions of the upper shell module and lower shell module removed, illustrating a container and a catalytic combustion assembly.
FIG. 13 is a bottom perspective view of the container for containing a beverage or food that more specifically illustrates that the bottom of the container is a flat surface, with the top chamber plate not being an integral part of the container.
Figure 12:
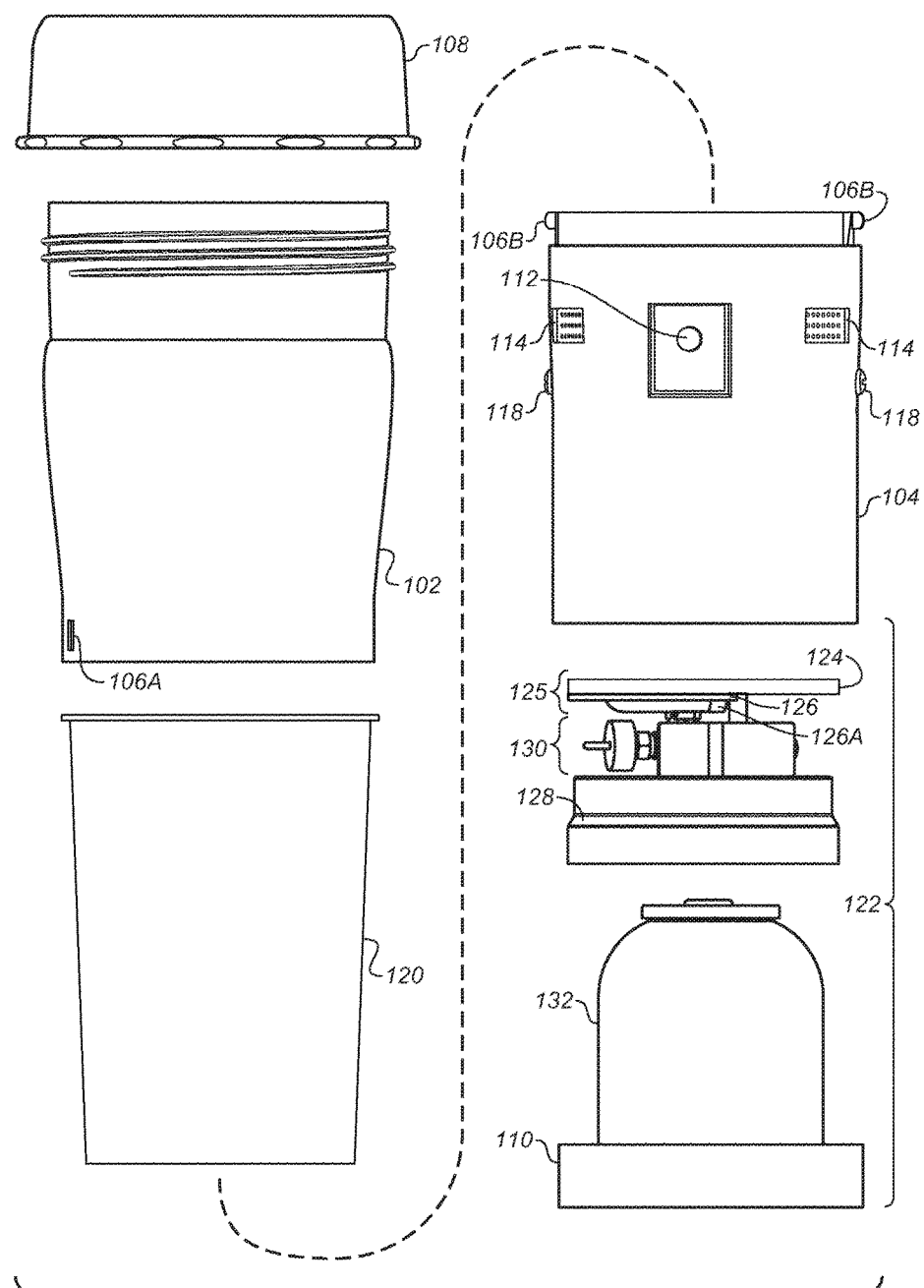
FIG. 12 is an exploded side view of the other embodiment of the catalytic heating system, showing the upper and lower shell modules, the container for containing the beverage or food, and the catalytic combustion assembly comprising a top chamber plate coupled to a bottom chamber plate, a fuel supply assembly, a fuel supply platform and a fuel canister.

FIG. 11 and FIG. 12 illustrate that the upper shell module 102 houses a container 120 for containing a beverage or food and that the lower shell module 104 contains the catalytic combustion assembly 122 for heating the container 120 and its contents. The figures also show that the catalytic combustion assembly 122 comprises: a top chamber plate 124 that is not integral with the bottom of the container 120; a bottom chamber plate 126 coupled to the top chamber plate 124, thereby forming an integrated chamber plate 125; a fuel supply platform 128; a fuel supply assembly 130 having tubular connections to the fuel supply platform 128 and to the bottom chamber plate 126; a fuel canister 132 having the canister base 110 attached to a bottom of the fuel canister 132, with the fuel canister 132 removably attached to the fuel supply platform 128; and dimethyl ether fuel gas 127 as the preferred fuel gas contained in a state of compression within the fuel canister 132. As mentioned above, a reference to a "fuel" or a "fuel gas" means fuel in a gaseous phase, unless indicated otherwise.

The container 120 can be secured to the upper shell module 102 by bonding an outside top perimeter of the container 120 to an inside top perimeter of the upper shell module 102 and by similarly bonding an outside bottom perimeter of the container 120 to an inside bottom perimeter of the upper shell module 102. And, fuel supply platform 128 can be secured to the lower shell module 104 by using the plurality of screws 118 to attach an inside perimeter of the lower shell module 104 to an outside perimeter of the fuel supply platform 128. The shell lid 108 can be removably attached to a top end of the upper shell module 102 by screwing the shell lid 108, having female threads around its inside perimeter, to the upper shell module 102, having male threads around its top outside perimeter. The container 120 can be any container that can conduct heat, such as a cup mug or sauce pan; preferably the container 120 will have a metallic composition. And, the upper and lower shell modules 102 and 104 can be made of a thermally non-conductive material, preferably a polymeric material; alternatively, the container 120 can have a thermally insulating layer disposed between a sidewall 121 of the container 120 and the upper shell module 102.

The components of the catalytic heating assembly 122 are illustrated in more detail in FIG. 13 through 16. FIG. 13 illustrates that in this embodiment the top chamber plate 124 is not integral with the bottom of the container 120, with the container 120 having a flat container bottom 123 integral with the sidewall 121 of the container 120. FIG. 14A through 14E further illustrate that a bottom surface of the top chamber plate 124 contains a top channel 124A that is integral with the top chamber plate 124 and preferably has a concave half-cylindrical shape, with the top channel 124A also having a curved center section 124B and a pair of linear sections 124C integral with corresponding ends of the curved center section 124B. A top surface of the bottom chamber plate 126 similarly contains a bottom channel 126A, that is integral with the bottom chamber plate 126 and preferably has a concave half-cylindrical shape that extends partially below the bottom surface of bottom chamber plate 22, with the bottom channel 126A having a curved center section 126B and a pair of linear sections 126C integral with corresponding ends of the curved center section 126B. When top and bottom chamber plates, 124 and 126, are aligned in a predetermined manner and coupled together to form the integrated chamber plate 125, top channel and bottom channel, 124A and 126A, form an elongate sidewall enclosure 142, having a preferred cylindrical shape, a curved sidewall center section 142A and a pair of linear sidewall end sections 142B integral with corresponding ends of the curved sidewall center section 142A. The elongate sidewall enclosure 142 encloses and defines an enclosed catalytic combustion chamber 140 that extends through the elongate sidewall enclosure 142, with the chamber 140 having the same curved and linear shape as the elongate sidewall enclosure 142. The elongate sidewall enclosure 142 and the enclosed catalytic combustion chamber 140 are best illustrated in FIG. 14C through FIG. 14E. The side view of FIG. 14C illustrates the top and bottom chamber plates, 124 and 126, after they have been coupled together forming the integrated chamber plate 125; the cross-sectional view of FIG. 14D shows the catalytic combustion chamber 140 enclosed within the elongate sidewall enclosure 142, with a catalytic reaction media 160 and a combustion starting element 164 (described below) removed; and the top plan view of FIG. 14E, with the top chamber plate 124 removed, further illustrates the catalytic combustion chamber 140, elongate sidewall enclosure 142 and the curved sidewall section 142A and pair of linear sidewall sections 142B, also with the catalytic reaction media 160 and combustion starling element 164 removed.

The elongate sidewall enclosure 142 preferably should have a diameter that is relatively small in order to ensure that the curved portion of the sidewall enclosure 142 can bend in a smooth and continuous fashion within the coupled chamber plates 124 and 126; and in order to more evenly distribute the heat generated from the catalytic combustion chamber 140 to the top chamber plate 124 and to the top bottom of the container 120 that is adjacent to the top chamber plate 124, which, in turn, provides for a more even distribution of heat to the beverage or food. At the same time, however, the elongate sidewall enclosure 142 should have a diameter and length that are large enough to contain a sufficient quantity of a catalytic reaction media 160 over the length of the sidewall enclosure 142 to produce a sufficient amount of heat to effectively the top chamber plate 124, bottom of the container 120 and the beverage or food within container 120. Given these considerations, the inventors have determined that the elongate sidewall enclosure 142 preferably should have a diameter of about 10 millimeters or less, and more preferably between about 5 and 10 millimeters. The elongate sidewall enclosure 142 also has a flow-through fuel gas inlet 142C within one end of the sidewall enclosure 142 and a flow-through exhaust outlet 142D within the other end of the sidewall enclosure 142, with the sidewall enclosure 142 having no other flow-through openings within the sidewall enclosure 142. And, a flow-through fuel gas inlet elbow 150 and a flow-through exhaust outlet elbow 152 are sealably disposed within the flow-through fuel gas inlet 142C and the flow-through exhaust outlet 142D, respectively. The flow-through exhaust outlet elbow 152 also has a tubular connection 153 with the exhaust outlet duct 116 within the lower shell module 104. The tubular connection 153 effectively extends the enclosed length of the elongate sidewall enclosure 142 from the flow-through exhaust outlet 142D of sidewall enclosure 142 to the exhaust outlet duct 116.

It is preferred that the top and bottom chamber plates, 124 and 126, are coupled together by utilizing a plurality of binder posts 154, with top portions of the binder posts 154 disposed within corresponding openings through the top chamber plate 124, with bottom portions of the binder posts 154 disposed within corresponding openings through the bottom chamber plate 126, and with bottom ends of the binder posts 154, which extend away from the bottom surface of the bottom chamber plate 126, used to couple the top chamber plate 124 to the bottom chamber plate 126 by flattening the ends of the binder posts 154 against the bottom surface of the chamber plate 126. Preferably, the top and bottom chamber plates, 124 and 126, have a metallic composition.

Figure 14A:
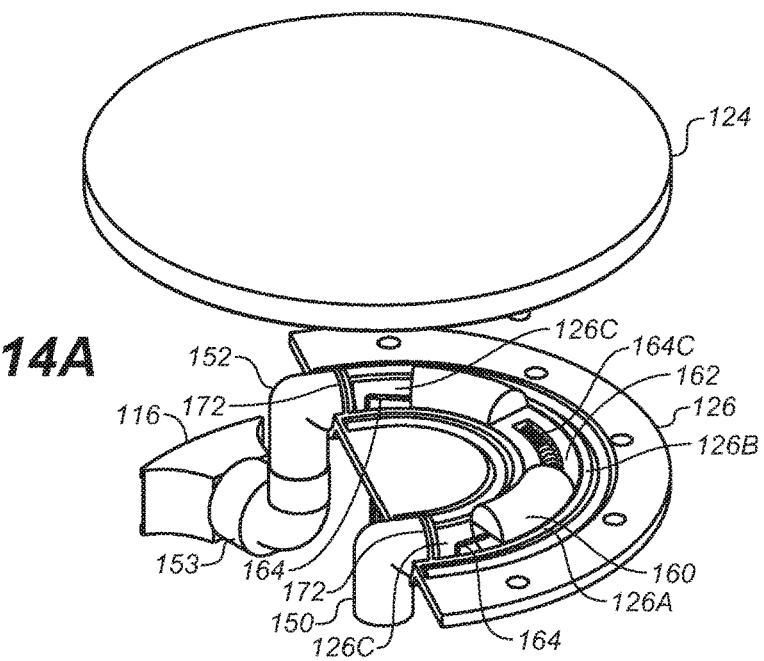
FIG. 14A is an exploded top perspective view of a top chamber plate and a bottom chamber plate, illustrating that a catalytic combustion chamber can be formed when the top and bottom chamber plates are coupled together.
Figure 14B:
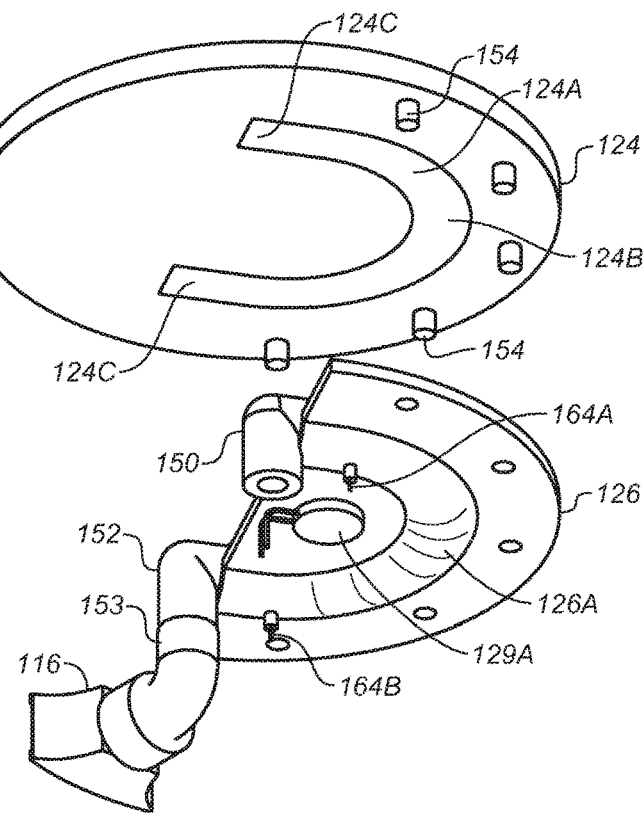
FIG. 14B is an exploded bottom perspective view of the top chamber plate and bottom chamber plate, also illustrating that the catalytic combustion chamber can be formed when the top and bottom chamber plates are coupled together.
Figure 14C:
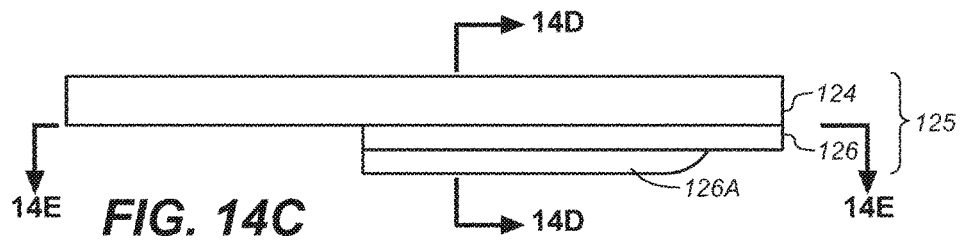
FIG. 14C is a partial side view of the top and bottom chamber plates that have been coupled together, forming the catalytic combustion chamber.
Figure 14D:
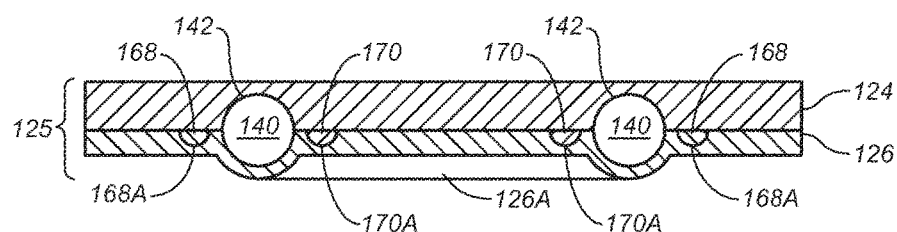
FIG. 14D is a cross-sectional view of FIG. 14C, providing a view in the direction indicated by the arrows 14D-14D in FIG. 14C.
Figure 14E:
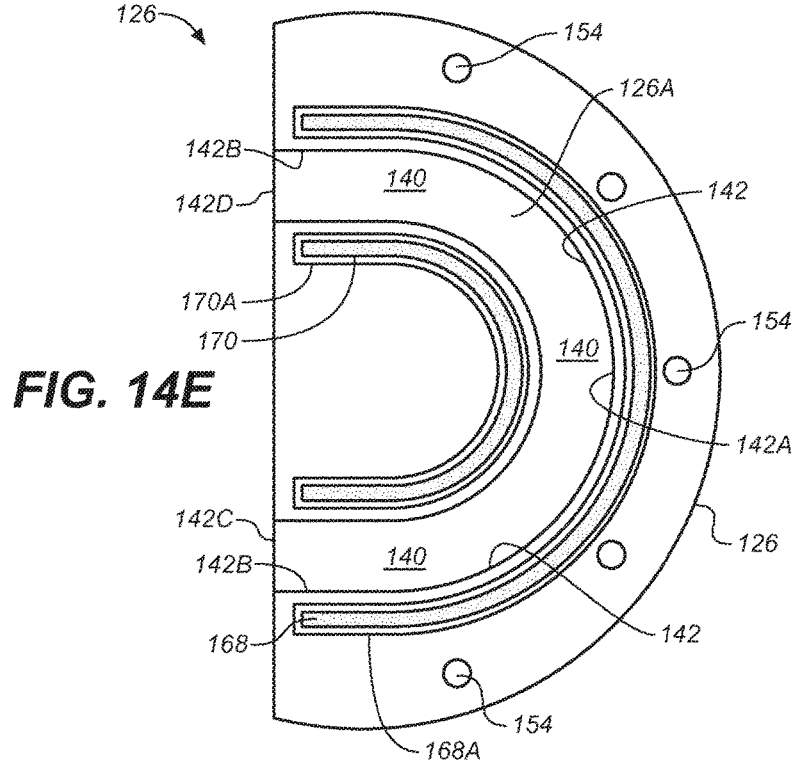
FIG. 14E is a top plan view of FIG. 14C with the top chamber plate removed, providing a view in the direction indicated by the arrows 14E-14E in FIG. 14C.

Before the enclosed catalytic combustion chamber 140 is formed by coupling the top and bottom chamber plates, 124 and 126, the catalytic reaction media 160 preferably can be positioned in a curved orientation, as shown in FIG. 5A, within the curved section 126B of bottom channel 126A. Alternatively, the catalytic reaction media 160 can be positioned in a curved and linear orientation within the curved section 126B of bottom channel 126A and within the pair of linear sections 126C of bottom channel 126A. Although the figure shows that a center top half of the catalytic reaction media 160 has been removed, this is only for the purpose of revealing a curved passage 162 that extends lengthwise through the interior of the catalytic reaction media 160. As also shown in FIGS. 14A and 14B, a combustion starting element 164, preferably made from a narrow gage resistance wire alloy, such as Nichrome 60, Nichrome 60 or Kanthal, can be disposed lengthwise through a center portion of the catalytic reaction media 160, with one end 164A of the combustion starting element 164 disposed through an opening within the bottom channel 126A and another end 164B of the combustion starting element 164 disposed through another opening through the bottom channel 126A, and with a center portion 164C of the combustion starting element 164 disposed through the curved passage 162 within the catalytic reaction media 160. Preferably, as illustrated in FIGS. 14A and 14B, the center portion 164C of the combustion starting element 164 is coiled, which causes the combustion starting element 164 to attain a higher ignition temperature for a given amount of electrical power than would otherwise exist if the combustion starting element 164 were not coiled. The ends, 164A and 164B, of the combustion starting element 164 are in electronic connection with a programmed microprocessor 166 which, when activated, supplies electrical current a battery 138, such as a lithium polymer type battery, to the combustion starting element 164. Alternatively, the combustion starting element 164 can be a spark ignition system comprising a pair of wires disposed within a lengthwise opening within the catalytic reaction media 164, with the pair of wires separated by a predetermined distance within the opening. A large transient electric voltage is formed between the wires using techniques well known to those skilled in the art, such as utilizing a piezoelectric crystal that can produce a substantial voltage when squeezed by mechanical means. The resulting large voltage causes the discharge of a spark between the pair of wires that ignites the catalytic reaction media 164. And, as best illustrated in FIG. 14A through FIG. 14E, in order to ensure that the catalytic combustion process is confined to the catalytic combustion chamber 140, sealing members 168 and 170 are disposed within corresponding sealing channels 168A and 170A within the bottom chamber plate 126, with the sealing channel 168A concentrically positioned outside of bottom channel 126A and sealing channel 170A concentrically positioned inside of bottom channel 126A. In addition, a pair of O-rings 172 is disposed around corresponding portions of flow-through fuel gas inlet elbow 150 and flow-through exhaust outlet elbow 152 in order to further seal the catalytic combustion chamber 140.

Once the catalytic reaction media 160 and combustion element 164 are positioned within the curved bottom channel 126A and the top chamber plate 124 is coupled to the bottom chamber plate 126, the catalytic reaction media 160 and the combustion element 164 are captured in a curved orientation within the curved sidewall section 142A of the elongate sidewall enclosure 142, thereby defining catalytic combustion chamber 140 as having the same shape as the elongate sidewall enclosure 142. In this regard, a curved elongate shape for the catalytic combustion chamber 140 is preferred in order to more evenly distribute the heat from the combustion chamber 140 to the top chamber plate 124 and, thereby, provide for a more even distribution of heat to the beverage or food within container 120. And, the most preferred curved elongate shape for the catalytic combustion chamber 140 is a curvature having a constant radius of curvature (hereinafter referred to as a "circular curvature"), providing a smooth and continuous surface within the combustion chamber 140. Although the catalytic combustion chamber 140 having a circular curvature is preferred, as described in connection with catalytic heating system 1, other curved shapes, such as serpentine or coiled, can be used with catalytic heating system 100.

Figure 15A:
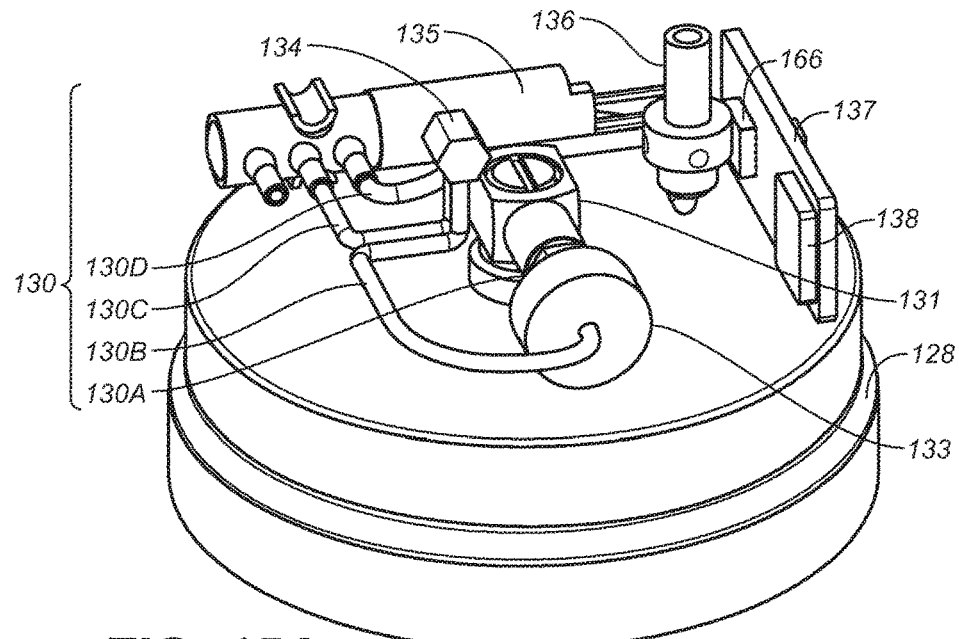
FIG. 15A and FIG. 15B are top perspective and top plan views, respectively, of the fuel supply assembly mounted on the fuel supply platform.
Figure 15B:
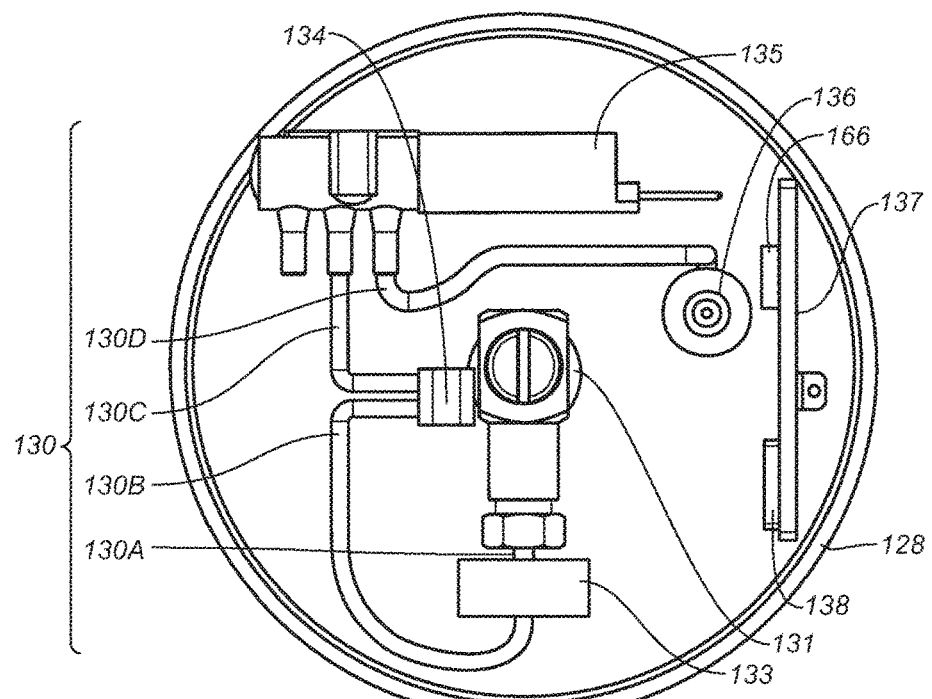

FIGS. 15A and 15B more specifically illustrate the fuel supply assembly 130 that is mounted on a topside of fuel supply platform 128. The fuel supply assembly 130 comprises the following fuel supply components: a fuel inlet valve 131 having a compression fitting and tap for use in fluidly connecting the fuel assembly 130 to the fuel canister 132, containing dimethyl ether fuel gas 127; a liquid/gas separator 133, which could be, but not limited to, a porous oleophobic membrane such as "Supor R" made by Pall Corporation, having a tubular connection through tube 130A with the fuel inlet valve 131, with the liquid/gas separator 133 for removing any dimethyl ether fuel gas 127 that is in liquid form; a pressure regulator 134, such as an ultra-miniature regulator from the "PR-MLS" model series by Beswick Engineering, having a tubular connection through tube 130B with the liquid/gas separator 133, with the pressure regulator 134 for maintaining the pressure of the dimethyl ether fuel gas 127 at a predetermined level; a solenoid valve 135, such as the "LHL" series from the Lee Company, having a tubular connection through tube 130C with the pressure regulator 134, with the solenoid valve 135 for opening and closing the flow of dimethyl ether fuel gas 127 through the fuel supply assembly 130; a fuel and air mixing injector 136, such as a venturi injector, having a tubular connection through tube 130D with the solenoid valve 135, with the fuel and air mixing injector 136 for injecting the dimethyl ether fuel gas 127 and entrained air into the catalytic combustion chamber 140; and a temperature sensor 129A attached to the bottom surface of the bottom chamber plate 126 for sensing the temperature within the catalytic combustion chamber 140; and a temperature sensor 129B attached to the outside surface of the sidewall 121 of container 120 for sensing the temperature of the container 120. And, the fuel supply assembly 130 has a tubular connection to the catalytic combustion chamber 140 by inserting a top end of the fuel and air mixing injector 136 into the flow-through fuel gas inlet elbow 150 of the chamber 140.

The fuel supply assembly 130 further comprises the programmed microprocessor 166 that is attached to and in electrical connection to a circuit board 137 that is mounted on the top side of the fuel supply platform 128. A battery 138, such as a lithium polymer type GM502030 from PowerStream Technology, Inc., can also be attached to and in electrical connection to the circuit board 137, or the battery 138 can be attached to any other appropriate location within the catalytic combustion assembly 122 or within the lower shell module 104 surrounding the catalytic combustion chamber 140. The battery 138 supplies electrical power to the programmed microprocessor 166 when the on/off button 112 is in the "on" position and disconnects electrical power when the on/off button 112 is in the off position. When activated, the programmed microprocessor 166, with inputs from the temperature sensors 129A and 129B, controls the functionality of the solenoid valve 135 in order to control the fuel gas flow rate and temperature within the enclosed catalytic combustion chamber 140. The activated programmed microprocessor 166 also supplies electrical power to the combustion starting element 164, which the microprocessor 166 coordinates with the supply of fuel gas to the enclosed catalytic combustion chamber 140 by opening and closing the solenoid valve 135.

Figure 16:
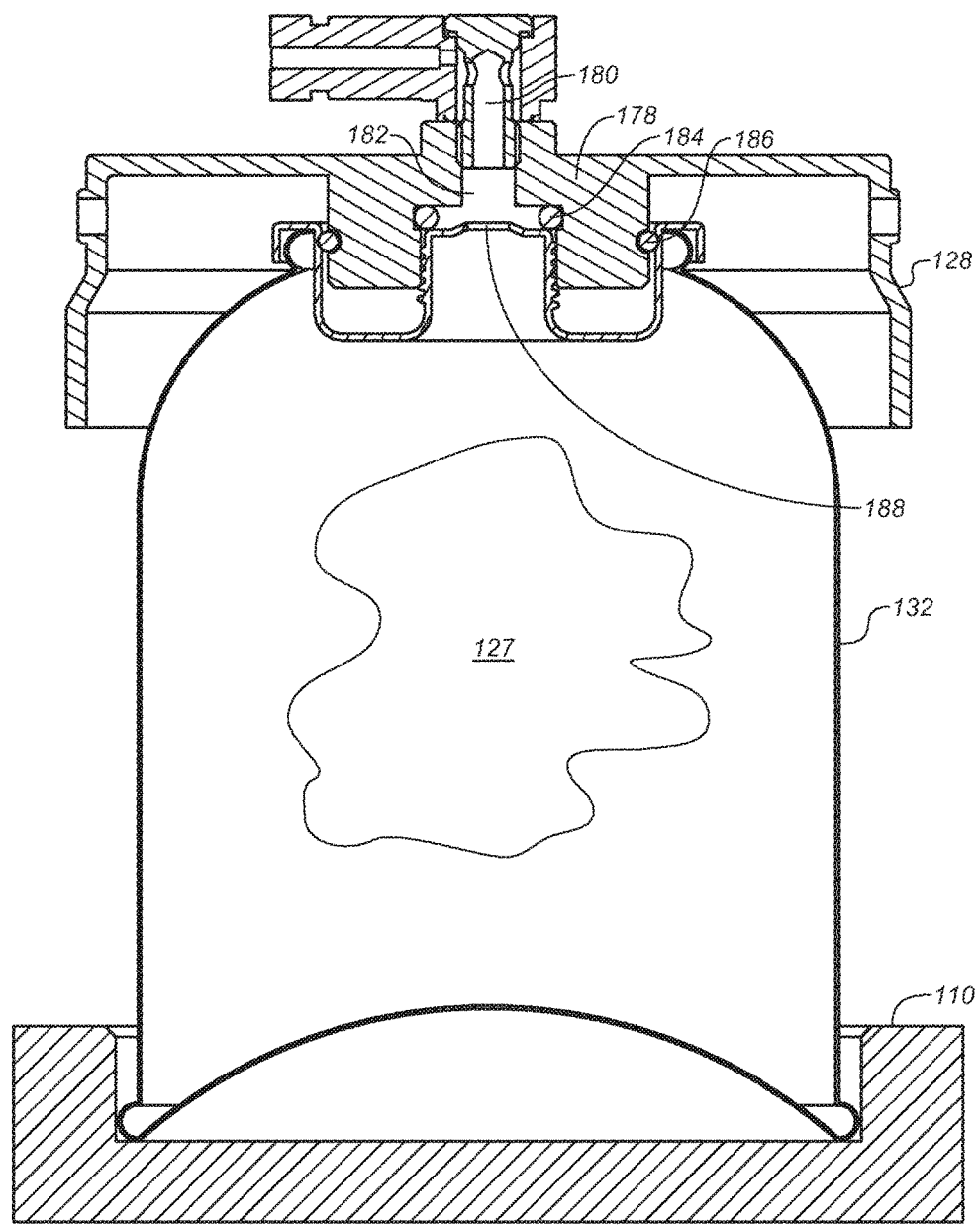
FIG. 16 is a cross-sectional side view of the fuel supply platform and the fuel canister releasably attached to the fuel supply platform.

The cross-sectional side view presented in FIG. 16 illustrates that fuel canister 132 can contain the dimethyl ether fuel gas 127 and that the fuel canister 132 can be releasably connected to the fuel supply platform 128. In order to facilitate the connection, the fuel supply platform 128 also comprises a platform receptacle 178, integral with an underside of the fuel supply platform 128, that contains a platform receptacle opening 180 leading to a cylindrically shaped cavity 182, with the cavity 182 having: female threads extending distally from the opening 180; an inner O-ring 184 disposed within the cavity 182 and positioned distally from the female threads; and an outer O-ring 186 disposed around an outside surface of the platform receptacle 178. The fuel canister 132 contains a fuel flow valve 188, integral with the top of the fuel canister 132, and having male threads that can be used to connect the fuel canister 132 to the fuel supply platform 128 by screwing the fuel flow valve 188 into the platform receptacle 178. This action causes: 1) the tap within fuel gas compression fitting 131 to open the fuel flow valve 188, thereby allowing the dimethyl ether fuel gas 127, which has been compressed within the fuel canister 132, to flow from the canister 132 into the fuel supply assembly 130; and 2) an outside surface of the fuel canister 132 to engage the outer O-Ring 186 and the fuel flow valve 188 to engage the inner O-ring 184, thereby preventing dimethyl ether fuel gas 127 within the fuel container 132 from escaping to atmosphere.

Figure 17A:
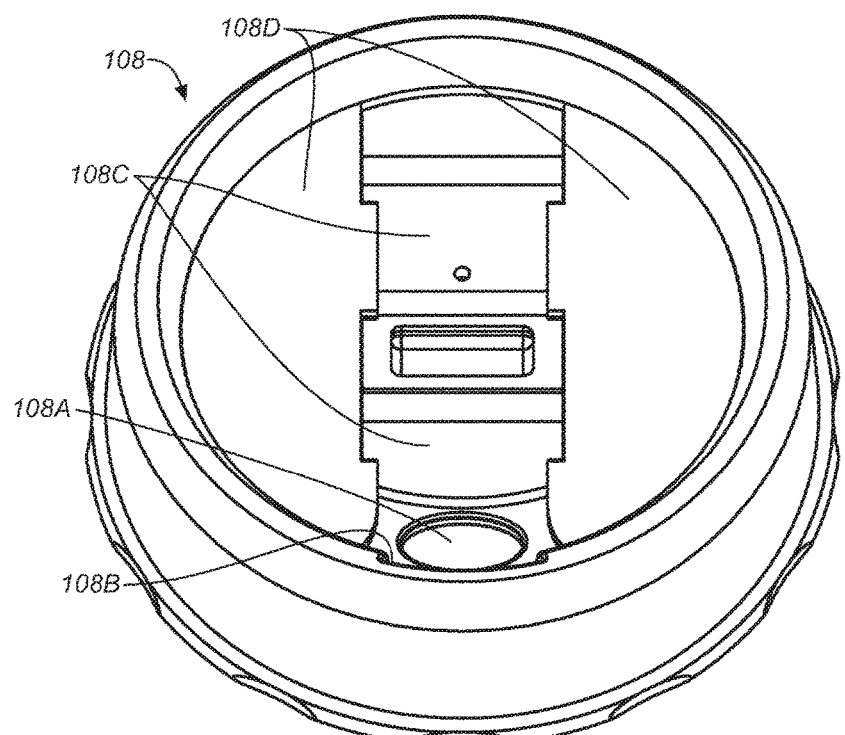
FIGS. 17A and 17B are top and bottom perspective views, respectively, of a shell lid.
Figure 17B:
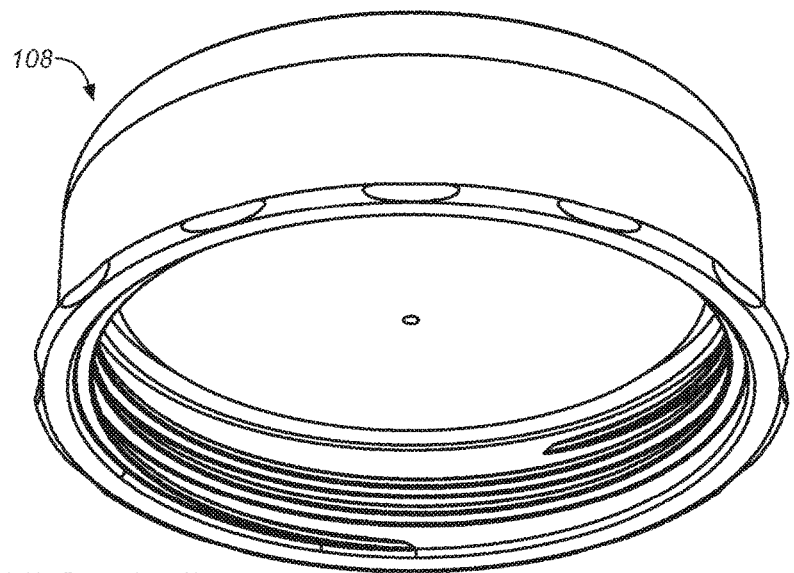

FIGS. 17A and 17B illustrate in more detail that the top of the shell lid 108 contains a flow opening 108A for allowing a beverage contained within the container 120 to flow out of the container 120 and into a flow guide 108B for channeling the flow of a beverage from the container 120. A shell slider valve 108C can be operated within a shell slider valve retainer 108D to open the shell slider valve 108C in order to allow the beverage to flow out of the container 120 or to close the shell slider valve 108C to prevent the beverage from flowing out of the container 120.

The catalytic heating system 100 has general industrial applicability in that it can be utilized to heat a container containing a beverage or food. Specifically, operation of the catalytic heating system 100 can proceed by providing a flow of the dimethyl ether fuel gas 127 by attaching the fuel canister 132, containing the dimethyl ether fuel gas 127 to the fuel supply platform 128, by screwing the fuel flow valve 188 into the platform receptacle 178, which causes the tap within the fuel gas compression fitting 131 to open the fuel flow valve 188 and causes the dimethyl ether fuel gas 127 within the fuel canister 132 to flow through compression fitting 131 and into the fuel supply assembly 130. The dimethyl ether fuel gas 127 will initially flow through the liquid/gas separator 133, where any fuel gas in liquid form will be removed, and then flow through the pressure regulator 134 that will maintain the fuel gas below a predetermined pressure, and continue flowing until it reaches the solenoid valve 135. With the on/off button 112 in the "off" position, the solenoid valve 135 will be closed, which prevents the dimethyl ether fuel gas 127 from flowing into the fuel and air mixing injector 136. Next, the catalytic heating system 100 can be operated to heat a beverage or food by, if necessary, removing the shell lid 108 by unscrewing it from its engagement with the top of the upper shell module 102. A beverage or food can then be placed into the container 120 and the shell lid 108 reattached to the upper shell module 102. The catalytic combustion process that is utilized to heat the beverage or food is initiated by depressing the on/off button 112 to the "on" position, which activates the programmed microprocessor 166 by closing the circuit connection between the battery 138 and programmed microprocessor 166. At a predetermined time after activation, the programmed microprocessor 166 causes the solenoid valve 135 to open, causing the dimethyl ether fuel gas 127 to flow into the fuel and air mixing injector 136. As the dimethyl ether fuel gas 127 flows through the fuel and air mixing injector 136, the velocity of the fuel gas flow 127 will increase due to the distal narrowing of the injector 136. Increasing the velocity of the dimethyl ether fuel gas 127 causes the pressure in the fuel and air mixing injector 136 to decrease, thereby entraining the dimethyl ether fuel gas 127 with atmospheric air in order to produce a dimethyl ether fuel gas and entrained air mixture, while maintaining an entrainment ratio of about 15 or more parts air to about one part dimethyl ether fuel gas 127 for the mixture. The dimethyl ether fuel gas and the entrained air mixture is injected by the fuel and air mixing injector 136 into the flow-through fuel gas inlet elbow 150 and then into the elongate sidewall enclosure 142 defining the catalytic combustion chamber 140, thereby constraining the flow of the mixture though the catalytic combustion chamber 140 to the curved and linear path best illustrated in FIG. 14E. While the flow of the dimethyl ether fuel gas and entrained air mixture is flowing through the catalytic combustion chamber 140, additional actions that contribute to the generation of the catalytic combustion process are: contacting the dimethyl ether fuel gas and entrained air mixture with the catalytic reaction media 160 and the combustion starting element 164; activating the programmed microprocessor 166 to cause an electrical current to be supplied to the combustion starting element 164, which causes the combustion starling element 164 to heat up, thereby igniting the flow of dimethyl ether fuel and entrained air mixture and generating the catalytic combustion process within the catalytic reaction media 160 within catalytic combustion chamber 140. The heat generated by the catalytic combustion process causes the top channel 124A and top chamber plate 124 to heat up by conducting heat away from the catalytic combustion chamber 140, which in turn heats the container 120 and the beverage or food within the container 120. Exhaust generated from the catalytic combustion process passes through the flow-through exhaust outlet elbow 152, through the tubular connection 153 between the outlet elbow 152 and the exhaust outlet duct 116 within the lower shell module 104, and out the exhaust outlet duct 116.

The advantages and unexpected results provided by the catalytic heating system 100 are the same as the advantages, and unexpected results of the catalytic heating system 1 described above. However, the catalytic heating system 100 has the additional advantage of being able to remove the upper shell module 102 and its attached container 120 within the upper shell module 102 from the lower shell module 104, providing the conveniences of using and washing the container 120 separate from the lower shell module 104.

Although a preferred embodiment and other embodiments have been described, it will be recognized by those skilled in the art that other embodiments and features can be provided without departing from the underlying principles of those embodiments. The scope of the invention is defined by the appended claims.

INDUSTRIAL APPLICABILITY

The catalytic heating system 1 has general industrial applicability in that it can be utilized to heat a container containing a beverage or food.

The invention claimed is:

1. A catalytic heating system for heating a beverage or food, comprising:
   a container for containing the beverage or food;
   a catalytic combustion assembly for heating the container, comprising:

a chamber plate having a top side and a bottom side, with the top side of the chamber plate integral with the bottom of the container;

an elongate sidewall enclosure integral with and contained within the chamber plate, with the elongate sidewall enclosure forming an enclosed catalytic combustion chamber; with the elongate sidewall enclosure having a fuel gas inlet and an exhaust outlet within corresponding ends of the elongate sidewall enclosure; with the fuel gas inlet and exhaust outlet extending through the bottom side of the chamber plate; and with the elongate sidewall enclosure thereby providing flow-through paths for a fuel gas to enter the enclosed catalytic combustion chamber through the fuel gas inlet and for an exhaust to exit the enclosed catalytic combustion chamber through the exhaust outlet;

a catalytic reaction media disposed within the enclosed catalytic combustion chamber;

a combustion starting element disposed within the enclosed catalytic combustion chamber;

a fuel supply assembly mounted on a fuel supply platform, with the fuel supply assembly having a fuel and air mixing injector fluidly connected to the fuel gas inlet;

a fuel canister sealably connected to the fuel supply platform and fluidly connected to the fuel supply assembly, with the fuel canister for containing the fuel gas; and a shell containing the container and catalytic combustion assembly, thereby forming the catalytic heating system for heating the beverage or food;

whereby the fuel and air mixing injector within the catalytic combustion assembly can entrain the fuel gas with air and inject a fuel gas and entrained air mixture into the enclosed catalytic combustion chamber where the combustion starting element can ignite the fuel gas and entrained air mixture, and the catalytic reaction media can maintain a catalytic combustion process within the enclosed catalytic combustion chamber, and with the heat energy generated within the catalytic reaction media transferred by thermal conduction to the chamber plate integral with the bottom of the container for containing the beverage or food.

2. The catalytic heating assembly of claim 1 in which the fuel gas is dimethyl ether.

3. The catalytic heating assembly of claim 1 in which the fuel gas has a stoichiometric air to fuel ratio of about 15.

4. The catalytic heating assembly of claim 1 in which the catalytic reaction media comprises an open cell metal foam substrate, combined with a catalyst support and an active catalyst.

5. The catalytic heating assembly of claim 1 in which the elongate sidewall enclosure is a cylindrically shaped enclosure.

6. The catalytic heating assembly of claim 5 in which the cylindrically shaped enclosure has a curved shape.

7. The catalytic heating assembly of claim 6 in which the curved shape of the cylindrically shaped enclosure has a circular curvature.

8. The catalytic heating assembly of claim 5 in which the cylindrically shaped enclosure has a serpentine shape.

9. The catalytic heating assembly of claim 5 in which the cylindrically shaped enclosure has a coiled shape.

10. The catalytic heating assembly of claim 5 in which the cylindrically shaped enclosure has a partially curved and linear shape.

11. The catalytic heating assembly of claim 5 in which the cylindrically shaped enclosure has a diameter of about 10 millimeters or less.

12. The catalytic heating assembly of claim 5 in which the cylindrically shaped enclosure has a diameter of between about 5 millimeters and about 10 millimeters.

13. A catalytic heating system for heating a beverage or food, comprising:

an upper shell;

a container disposed within the upper shell, with the container for containing the beverage or food;

a catalytic combustion assembly for heating the container, comprising:

a chamber plate having a top side and a bottom side, with the top side of the chamber plate for contacting the bottom of the container;

an elongate sidewall enclosure integral with and contained within the chamber plate, with the elongate sidewall enclosure forming an enclosed catalytic combustion chamber; with the elongate sidewall enclosure having a fuel gas inlet and an exhaust outlet within corresponding ends of the elongate sidewall enclosure; with the fuel gas inlet and exhaust outlet extending through the bottom side of the chamber plate; and with the elongate sidewall enclosure thereby providing flow-through paths for a fuel gas to enter the enclosed catalytic combustion chamber through the fuel gas inlet and for an exhaust to exit the enclosed catalytic combustion chamber through the exhaust outlet;

a catalytic reaction media disposed within the enclosed catalytic combustion chamber;

a combustion starting element disposed within the enclosed catalytic combustion chamber;

a fuel supply assembly mounted on a fuel supply platform, with the fuel supply assembly having a fuel and air mixing injector fluidly connected to the fuel gas inlet;

a fuel canister sealably connected to the fuel supply platform and fluidly connected to the fuel supply assembly, with the fuel canister for containing a fuel gas; and a lower shell containing the catalytic combustion assembly, with the lower shell releasably attached to the upper shell, thereby contacting the top side of the chamber plate with the bottom of the container and forming the catalytic heating assembly for heating a beverage or food and contacting the chamber plate with the bottom of the container;

whereby the fuel and air mixing injector within the catalytic combustion assembly can entrain the fuel gas with air and inject a fuel gas and entrained air mixture into the enclosed catalytic combustion chamber where the combustion starting element can ignite the fuel gas and entrained air mixture, and the catalytic reaction media can maintain a catalytic combustion process within the enclosed catalytic combustion chamber, and with the heat energy generated within the catalytic reaction media transferred by thermal conduction to the chamber plate in contact with the bottom of the container for containing the beverage or food.

14. The catalytic heating assembly of claim 13 in which the fuel gas is dimethyl ether.

15. The catalytic heating assembly of claim 13 in which the fuel gas has a stoichiometric air to fuel ratio of about 15.

16. The catalytic heating assembly of claim 13 in which the catalytic reaction media comprises an open cell metal foam substrate, combined with a catalyst support and an active catalyst.

17. The catalytic heating assembly of claim 13 in which the elongate sidewall enclosure is a cylindrically shaped enclosure.

18. The catalytic heating assembly of claim 17 in which the cylindrically shaped enclosure has a curved shape.

19. The catalytic heating assembly of claim 18 in which the curved shape of the cylindrically shaped enclosure has a circular curvature.

20. The catalytic heating assembly of claim 17 in which the cylindrically shaped enclosure has a serpentine shape.

21. The catalytic heating assembly of claim 17 in which the cylindrically shaped enclosure has a coiled shape.

22. The catalytic heating assembly of claim 17 in which the cylindrically shaped enclosure has a partially curved and linear shape.

23. The catalytic heating assembly of claim 17 in which the cylindrically shaped enclosure has a diameter of about 10 millimeters or less.

24. The catalytic heating assembly of claim 17 in which the cylindrically shaped enclosure has a diameter of between about 5 millimeters and about 10 millimeters.

* * * * *